United States Patent
Desai et al.

(10) Patent No.: US 10,952,280 B2
(45) Date of Patent: Mar. 16, 2021

(54) APPARATUS, SYSTEM AND METHOD OF COMMUNICATING VOICE TRAFFIC OVER A BLUETOOTH LINK

(71) Applicant: INTEL CORPORATION, Santa Clara, CA (US)

(72) Inventors: Prasanna Desai, Elfin Forest, CA (US); Hakan Magnus Eriksson, Portland, OR (US); Sebastien Fievet, Cupertino, CA (US); Sunil Kumar, Cupertino, CA (US); Oren Kaidar, Binyamina (IL)

(73) Assignee: INTEL CORPORATION, Santa Clara, CA (US)

( * ) Notice: Subject to any disclaimer, the term of this patent is extended or adjusted under 35 U.S.C. 154(b) by 60 days.

(21) Appl. No.: 16/367,934

(22) Filed: Mar. 28, 2019

(65) Prior Publication Data

US 2019/0230738 A1 Jul. 25, 2019

(51) Int. Cl.
| | |
|---|---|
| *H04W 88/04* | (2009.01) |
| *H04W 4/80* | (2018.01) |
| *H04W 4/70* | (2018.01) |
| *H04W 72/04* | (2009.01) |
| *H04W 4/10* | (2009.01) |
| *H04L 1/18* | (2006.01) |
| *H04L 1/00* | (2006.01) |

(52) U.S. Cl.
CPC ........... *H04W 88/04* (2013.01); *H04L 1/0061* (2013.01); *H04L 1/189* (2013.01); *H04W 4/10* (2013.01); *H04W 4/70* (2018.02); *H04W 4/80* (2018.02); *H04W 72/0446* (2013.01)

(58) Field of Classification Search
None
See application file for complete search history.

(56) References Cited

U.S. PATENT DOCUMENTS

| | | | | |
|---|---|---|---|---|
| 2006/0205401 | A1* | 9/2006 | Palin | H04M 1/6066 455/425 |
| 2009/0003252 | A1* | 1/2009 | Salomone | H04W 40/244 370/311 |
| 2009/0312010 | A1* | 12/2009 | Hall | H04W 72/1215 455/426.1 |
| 2013/0259010 | A1* | 10/2013 | Jechoux | H04W 72/02 370/336 |
| 2016/0360326 | A1* | 12/2016 | Bergmann | H04R 25/407 |

(Continued)

OTHER PUBLICATIONS

Bluetooth Core Specification V 5.0, Dec. 6, 2016, 2822 pages.

*Primary Examiner* — Lonnie V Sweet
(74) *Attorney, Agent, or Firm* — Shichrur & Co.

(57) ABSTRACT

For example, an apparatus may be configured to cause a first Bluetooth (BT) mobile device to configure a P2P voice link for voice communication between first and second BT audio devices via a first BT Short-Range (SR) link, a BT Long-Range (LR) link and a second BT SR link, the first BT SR link between the first BT audio device and the first BT mobile device, the BT LR link between the first BT mobile device and a second BT mobile device, and the second BT SR link between the second BT mobile device and the second BT audio device; to communicate a BT SR packet over the first BT SR link, the BT SR packet including a voice payload to be communicated between the first and second BT audio devices; and to communicate a BT LR packet including the voice payload over the BT LR link.

25 Claims, 7 Drawing Sheets

(56) References Cited

U.S. PATENT DOCUMENTS

| | | | | |
|---|---|---|---|---|
| 2018/0103394 A1* | 4/2018 | Gholmieh | ............... | H04L 47/33 |
| 2018/0248811 A1* | 8/2018 | Di Nallo | ................... | H04L 1/08 |
| 2018/0359729 A1* | 12/2018 | Okumura | .............. | H04L 1/0009 |
| 2019/0103914 A1* | 4/2019 | Junk | ................. | G05B 19/4186 |

* cited by examiner

APPARATUS, SYSTEM AND METHOD OF COMMUNICATING VOICE TRAFFIC OVER A BLUETOOTH LINK

TECHNICAL FIELD

Embodiments described herein generally relate to communicating voice traffic over a Bluetooth link.

BACKGROUND

A mobile phone, e.g., a Smartphone, may be connected and/or paired with an audio device, e.g., a headset, a wireless earphone, or a car speaker, for example, to transfer voice or sound between the mobile phone and the audio device using a Bluetooth short-range link.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
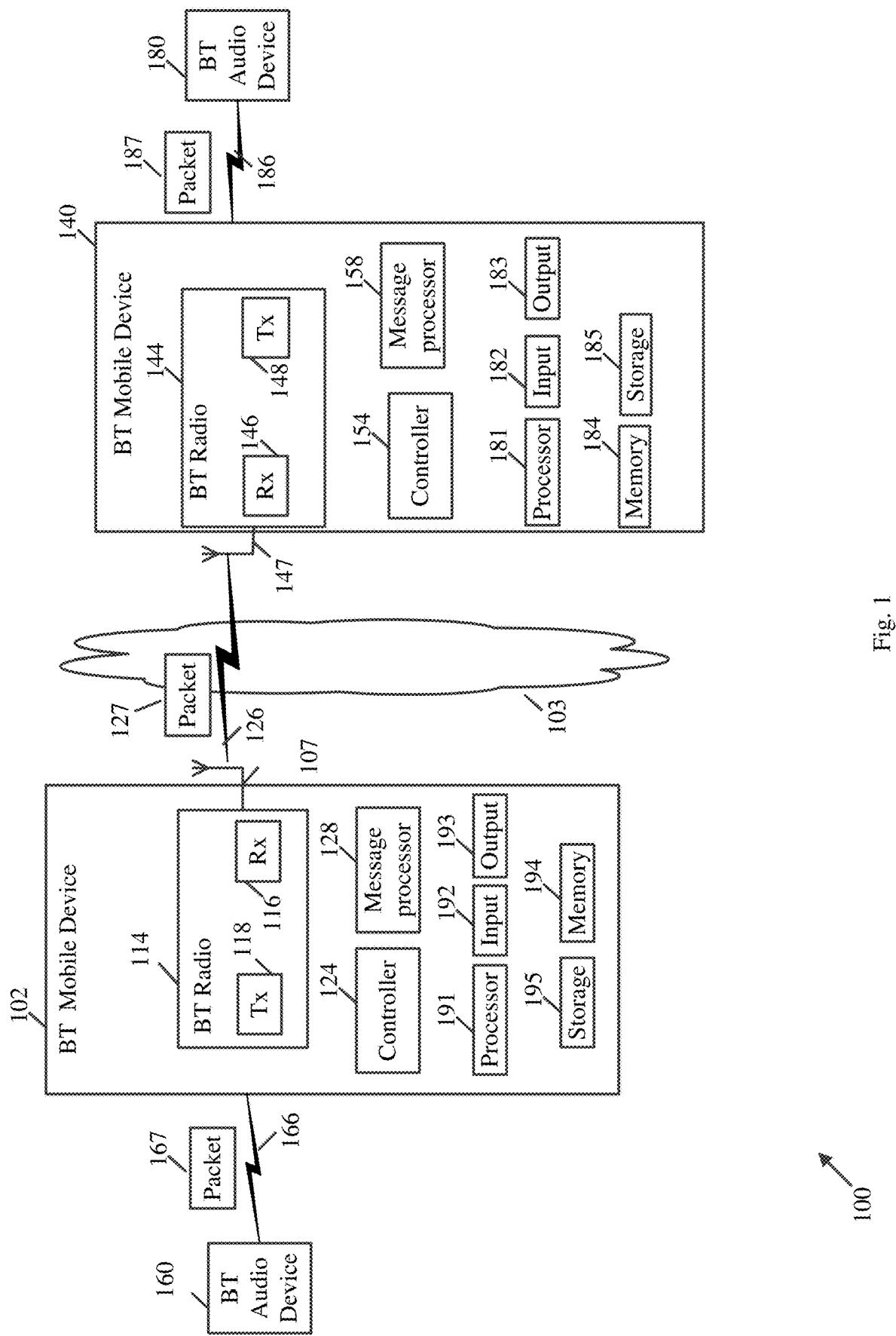
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Bluetooth device, a Bluetooth Low Energy (BLE) device, a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Bluetooth standards ("the Bluetooth standards"), e.g., including Bluetooth Core Specification V 5.0, Dec. 6, 2016, and/or future versions and/or derivatives thereof, devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016)) and/or future versions and/or derivatives thereof, devices and/or networks operating in accordance with existing WFA Peer-to-Peer (P2P) specifications (WiFi P2P technical specification, version 1.7, Jul. 6, 2016) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, a Bluetooth system, a BLE system, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), Extended GPRS, Code-Division Multiple Access (CDMA), Wideband CDMA (WCDMA), CDMA 2000, single-carrier CDMA, multi-carrier CDMA, Multi-Carrier Modulation (MCM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE Advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz, or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Some demonstrative embodiments are described herein with respect to BT communication, e.g., according to a BT protocol and/or a BLE protocol. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., including wireless communication devices 102, 140, 160 and/or 180.

In some demonstrative embodiments, wireless communication devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102 and/or 140 may include, operate as, and/or perform the functionality of one or more STAs. For example, device 102 may include at least one STA, and/or device 140 may include at least one STA.

In some demonstrative embodiments, devices 102 and/or 140 may include, operate as, and/or perform the functionality of one or more BT devices.

In some demonstrative embodiments, devices 102 and/or 140 may include, operate as, and/or perform the functionality of one or more WLAN STAs.

In some demonstrative embodiments, devices 102 and/or 140 may include, operate as, and/or perform the functionality of one or more Wi-Fi STAs.

In one example, a station (STA) may include a logical entity that is a singly addressable instance of a medium access control (MAC) and physical layer (PHY) interface to the wireless medium (WM). The STA may perform any other additional or alternative functionality.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of device 102 and/or device 140 may be enclosed in a common housing or packaging, and may be interconnected or operably associated using one or more wired or wireless links. In other embodiments, components of device 102 and/or device 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103.

In some demonstrative embodiments, wireless medium 103 may include, for example, a radio channel, a BT channel, a cellular channel, a Global Navigation Satellite System (GNSS) Channel, an RF channel, a WiFi channel, an IR channel, and the like.

In some demonstrative embodiments, wireless communication medium 103 may include a 2.4 GHz frequency band, and/or one or more other wireless communication frequency bands, for example, a 5 GHz frequency band, a millimeter-Wave (mmWave) frequency band, e.g., a 60 GHz frequency band, a Sub-1 GHz (S1G) band, and/or any other frequency band.

In some demonstrative embodiments, devices 102, 140, 160 and/or 180 may include or perform one or more functionalities of BT devices.

In some demonstrative embodiments, devices 102, 140, 160 and/or 180 may include one or more BT radios including circuitry and/or logic to perform wireless communication between devices 102, 140 and/or one or more other BT devices. For example, device 102 may include at least one BT radio 114, and/or device 140 may include at least one BT radio 144.

In some demonstrative embodiments, devices 102, 140, 160 and/or 180 may include one or more other radios, e.g., a WiFi radio, an OFDM radio, a cellular radio, and/or the like.

In some demonstrative embodiments, BT radio 114 and/or BT radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, BT radio 114 and/or BT radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, BT radio 114, BT radio 144, transmitter 118, transmitter 148, receiver 116, and/or receiver 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative embodiments, BT radio 114 and/or BT radio 144 may be configured to communicate over a 2.4 GHz band and/or any other band.

In some demonstrative embodiments, BT radio 114 and/or BT radio 144 may include, or may be associated with, one or more antennas. For example, BT radio 114 may include, or may be associated with, one or more antennas 107; and/or BT radio 144 may include, or may be associated with, one or more antennas 147.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 160, 180 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140, 160, 180 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a device, e.g., device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a device, e.g., device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a communication medium, e.g., over a wireless communication channel in a wireless communication frequency band, for example, by applying to one or more fields of the PPDU one or more transmit waveforms. In other embodiments, message processor 128 may be configured to perform any other additional or alternative functionality and/or may include any other additional or alternative components to generate and/or process a message to be transmitted.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a communication medium, e.g., over a wireless communication channel in a wireless communication frequency band, for example, by applying to one or more fields of the PPDU one or more transmit waveforms. In other embodiments, message processor 158 may be configured to perform any other additional or alternative functionality and/or may include any other additional or alternative components to generate and/or process a message to be transmitted.

In some demonstrative embodiments, message processors 128 and/or 158 may include circuitry and/or logic, e.g., processor circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of network interface 110. For example, the chip or SoC may include one or more elements of controller 124, one or more elements of message processor 128, and/or one or more elements of network interface 110. In one example, controller 124, message processor 128, and network interface 110 may be implemented as part of the chip or SoC.

In other embodiments, controller 124, message processor 128 and/or network interface 110 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of network interface 120. For example, the chip or SoC may include one or more elements of controller 154, one or more elements of message processor 158, and/or one or more elements of network interface 120. In one example, controller 154, message processor 158, and network interface 120 may be implemented as part of the chip or SoC.

In some demonstrative embodiments, device 102 and/or device 140 may include, operate as, perform the role of, and/or perform one or more functionalities of, one or more STAs. For example, device 102 may include at least one STA, and/or device 140 may include at least one STA.

In some demonstrative embodiments, wireless communication devices 102 and/or 140 may form, or may communicate as part of, a wireless local area network (WLAN).

In some demonstrative embodiments, wireless communication devices 102 and/or 140 may form, or may communicate as part of, a BT network.

In some demonstrative embodiments, wireless communication devices 102 and/or 140 may form, or may communicate as part of, a WiFi network.

In other embodiments, wireless communication devices 102 and/or 140 may form, and/or communicate as part of, any other additional or alternative network.

In some demonstrative embodiments, devices 102, 140, 160 and/or 180 may include BT devices, e.g., as described below.

In some demonstrative embodiments, device 102 may include a BT mobile device, and/or device 140 may include a BT mobile device.

In one example, devices 102 and/or 140 may include BT Low Energy (LE) (BLE) compatible devices.

In some demonstrative embodiments, device 160 may include a BT audio device, and/or device 180 may include a BT audio device.

In some demonstrative embodiments, device 160 may include a BT headphone (also referred to as "headset") and/or device 180 may include a BT headphone.

In some demonstrative embodiments, device 160 may include a headset configured to be paired with device 102, and/or device 180 may include a headset configured to be paired with device 140.

In some demonstrative embodiments, devices 102, 140, 160 and/or 180 may be configured to implement and/or support one or more use cases of a long-range (LR) voice communication, e.g., as described below.

In some demonstrative embodiments, devices 102, 140, 160 and/or 180 may be configured to implement and/or support a LR point-to-point (P2P) communication between two BT mobile devices connected to two respective BT audio devices, e.g., headsets, for example, even when no other voice service is available.

For example, devices 102, 140, 160 and/or 180 may be configured to implement and/or support the LR P2P communication, for example, even in case of a cellular service coverage gap, an absence of WiFi hotspots and/or APs, and/or the like.

In one example, devices 102, 140, 160 and/or 180 may be configured to implement and/or support the LR P2P communication, for example, when device 102 is connected to device 160, and/or device 140 is connected to device 180, e.g., as described below.

In some demonstrative embodiments, a BT Short Range (SR) technology, e.g., a Bluetooth classic technology, may include a Short Range (SR) radio technology, for communication of voice, e.g., voice calls, between a BT mobile device and a BT audio device, e.g., a headset.

In some demonstrative embodiments, devices 102 and 160 may be configured to communicate voice over a first BT Short-Range (SR) link 166.

In some demonstrative embodiments, devices 140 and 180 may be configured to communicate voice over a second BT SR link 186.

In some demonstrative embodiments, BT SR link 166 may include a first enhanced Synchronous Connection-Oriented (eSCO) link, for example, according to a Hands Free Profile (HFP), e.g., as described below.

In some demonstrative embodiments, BT SR link 166 may include a second eSCO link, for example, according to the HFP, e.g., as described below.

In other embodiments, any other BT SR link may be used.

In some demonstrative embodiments, a BT Long Range (LR) technology, e.g., a BT Low Energy (LE) technology, may include an addition of a coded PHY, which may produce an increased communication range, e.g., a range, which is, theoretically, four times longer than a communication range of the BT SR technology.

In some demonstrative embodiments, the BT LR technology may be configured to support LR communication over an increased communication range between two mobile devices over a BT LR link, e.g., between devices 102 and 140. However, the BT LR technology is not currently designed with voice/audio use cases in mind.

In some demonstrative embodiments, the BT SR technology, e.g., the BT classic technology, and the BT LR technology, e.g., the BT LE technology, may be combined to support the LR P2P communication between two BT mobile devices connected to two respective BT audio devices, for example, headsets, e.g., as described below.

In some demonstrative embodiments, devices 102, 140, 160 and/or 180 may be configured to implement and/or support the LR P2P communication, for example, according to the BT LR technology, e.g., between two mobile devices, over a BT LR link.

In some demonstrative embodiments, devices 102, 140, 160 and/or 180 may be configured to implement and/or support communication over an LR P2P Voice link, which may include communication of audio signals over short distances, for example, between mobile devices and headsets, car kits and/or the like, e.g., between devices 102 and 160 and/or between devices 140 and 180; and communication of audio or voice signals over long distances, for example, between two mobile devices, for example, between mobile devices 102 and 140, e.g., as described below.

In some demonstrative embodiments, devices 102 and/or 140 may be configured to implement and/or support bidirectional, e.g., a full duplex, point-to-point voice communication between devices 102, 140, 160 and/or 180, for example, between two smart phones connected with headsets, e.g., as described below.

In some demonstrative embodiments, devices 102 and/or 140 may be configured to implement and/or support unidirectional, e.g., half duplex, point-to-point voice communication between devices 102, 140, 160 and/or 180, for example, between two smart phones connected with headsets, e.g., as described below.

In some demonstrative embodiments, devices 102 and/or 140 may be configured to implement and/or support the bidirectional P2P voice communication, for example, over an increased communication range, e.g., LR distances of the BT LE technology, e.g., as described below.

In some demonstrative embodiments, devices 102 and/or 140 may be configured to implement and/or support communication of voice packets over even longer distances, e.g., compared to the communication ranges of the BT LR technology, for example, using an LE coded PHY, for example, by modifying, e.g., slightly customizing, a BT LR frame structure and/or a MAC layer protocol, e.g., as described below.

In some demonstrative embodiments, devices 102 and/or 140 may be configured to implement and/or support communication of voice packets over the longer distances, for example, while maintaining a standard Bluetooth link between a mobile device, e.g., a phone, and a BT audio device, e.g., a headset, e.g., as described below.

In some demonstrative embodiments, devices 102 and/or 140 may be configured to implement and/or support communication of the voice packets over a BT LR link, for example, while maintaining compatibility with timings of a Bluetooth standard. For example, the communication of the voice packets over the BT LR link may coexist with existing BT standards, WiFi standards, LTE standards or any other existing standards, and, therefore, may benefit from existing coexistence arbitration techniques.

In some demonstrative embodiments, the BT LR communication of the voice traffic may benefit from existing coexistence management techniques, for example, between Bluetooth, WiFi and/or LTE technologies.

In some demonstrative embodiments, a Family Radio Service (FRS) technology for long range communication, in which two handheld radios, for example, walkie-talkie or the like, using channelized frequencies, e.g., around 462 and 467 MHz in the ultra-high frequency (UHF) band, may have one or more inefficiencies, disadvantages and/or technical problems, e.g., as described below.

In one example, the FRS technology may require using a specific, dedicated device, for example, if the FRS technology is not integrated in mobile phones or any other portable equipment.

In another example, FRS frequency bands of the FRS technology, which may be defined by a regulatory authority of a country, e.g., a US regulatory authority, may only be valid in the country, e.g., the US. According to this example, devices that are operating in the FRS frequency bands may be illegal to operate, e.g., in other countries.

In some demonstrative embodiments, devices 102 and/or 140 may be configured to implement and/or support communication over the LR P2P voice link according to a P2P voice communication mode (also referred to as a "full-duplex mode") including a full duplex communication at a long range between devices 102 and/or 140, for example, between two mobile devices, e.g., Smartphones, for example, devices 102 and/or 140, paired with BT audio devices, e.g., devices 160 and/or 180, e.g., as described below.

In some demonstrative embodiments, devices 102 and/or 140 may be configured to implement and/or support communication over the LR P2P voice link according to a P2P voice communication mode (also referred to as a "half-duplex mode"), including a half duplex communication, e.g., a Push To Talk (PTT) mode, at an increased range, between devices 102 and/or 140, for example, between two mobile devices, e.g., Smartphones, for example, devices 102 and/or 140, paired with BT audio devices, e.g., devices 160 and/or 180, e.g., as described below.

In some demonstrative embodiments, devices 102 and/or 10 may be configured to implement and/or support switching between the half duplex and the full duplex modes, for example, based on a link quality, and/or any other additional or alternative criteria, e.g., as described below.

In some demonstrative embodiments, devices 102 and/or 140 may be configured to implement and/or support the LR P2P voice link, for example, by customization of a MAC layer of a BT LE protocol, for example, while preserving an existing Bluetooth link, e.g., between a phone and a headset, in a way which may support usage of commercial headsets.

In some demonstrative embodiments, the LR P2P voice link may be implemented and/or supported, for example, even without modification to a Bluetooth PHY layer, for example, by modifying a Bluetooth LR MAC layer, for example, by customization, e.g., by slight customization.

In some demonstrative embodiments, the LR P2P voice link may extend a communication range of a Bluetooth LR PHY, for example, to enable voice communication, for example, even when no cellular service or WiFi service is available, for example, in cases of outdoor hiking or biking, international airports, or the like.

In some demonstrative embodiments, devices 102, 140, 160 and/or 180 may be configured to implement and/or support communication of device-to-device voice traffic, for example, concurrently with a standard Bluetooth connection, e.g., between a mobile phone and a headset, for example, by customizing a Bluetooth Long Range MAC layer, e.g., as described below.

In some demonstrative embodiments, devices 102 and/or 140 may be configured to setup a Point-to-Point (P2P) voice link for voice communication between devices 160 and 180, e.g., as described below.

In some demonstrative embodiments, controller 124 may be configured to control, cause, trigger and/or instruct, device 102 to configure a P2P voice link for voice communication between devices 160 and 180 via the first BT Short-Range (SR) link 166, a BT Long-Range (LR) link 126, and the second BT SR link 186, e.g., as described below.

In some demonstrative embodiments, the first BT SR link 166 may be between device 102 and device 160, e.g., as described below.

In some demonstrative embodiments, the BT LR link 126 may be between device 102 and device 140, e.g., as described below.

In some demonstrative embodiments, the second BT LR link 186 may be between device 140 and device 180, e.g., as described below.

In some demonstrative embodiments, controller 124 may be configured to control, cause, trigger and/or instruct, device 102 to communicate a first BT SR packet 167 with device 160 over the first BT SR link 166, e.g., as described below.

In some demonstrative embodiments, the BT SR packet 167 may include a voice payload to be communicated between devices 160 and 180, e.g., as described below.

In some demonstrative embodiments, controller 124 may be configured to control, cause, trigger and/or instruct, device 102 to communicate a BT LR packet 127 with device 140 over the BT LR link 126, e.g., as described below.

In some demonstrative embodiments, the BT LR packet 127 may include the voice payload, for example, to be communicated between devices 160 and 180, e.g., as described below.

In some demonstrative embodiments, controller 154 may be configured to control, cause, trigger and/or instruct, device 140 to communicate a second BT SR packet 187 with device 180 over the second BT SR link 186, e.g., as described below.

In some demonstrative embodiments, the BT LR packet 187 may include the voice payload, for example, to be communicated between devices 160 and 180, e.g., as described below.

In some demonstrative embodiments, the voice payload may include a voice payload to be transmitted from device 160 to device 180, e.g., as described below.

In some demonstrative embodiments, controller 124 may be configured to control, cause, trigger and/or instruct device 102 to receive the BT SR packet 167 from device 160 over the BT SR link 166, e.g., as described below.

In some demonstrative embodiments, controller 124 may be configured to control, cause, trigger and/or instruct device 102 to transmit the BT LR packet 127 including the payload of packet 167 to device 140 over the BT LR link 126, e.g., as described below.

In some demonstrative embodiments, controller 154 may be configured to control, cause, trigger and/or instruct device 140 to receive the BT LR packet 127 from device 102 over the BT LR link 126, e.g., as described below.

In some demonstrative embodiments, controller 154 may be configured to control, cause, trigger and/or instruct device 140 to transmit the BT SR packet 187, e.g., including the payload of packet 167, to device 180 over the BT SR link 186, e.g., as described below.

In some demonstrative embodiments, the voice payload may include a voice payload to be transmitted from device 180 to device 160, e.g., as described below.

In some demonstrative embodiments, controller 154 may be configured to control, cause, trigger and/or instruct device 140 to receive the BT SR packet 187 from device 180 over the BT SR link 186, e.g., as described below.

In some demonstrative embodiments, controller 154 may be configured to control, cause, trigger and/or instruct device 140 to transmit the BT LR packet 127 including the payload of packet 187 to device 102 over the BT LR link 126.

In some demonstrative embodiments, controller 124 may be configured to control, cause, trigger and/or instruct device 102 to receive the BT LR packet 127 from device 140 over the BT LR link 126, e.g., as described below.

In some demonstrative embodiments, controller 124 may be configured to control, cause, trigger and/or instruct device 102 to transmit the BT SR packet 167 to device 160 over the BT SR link 166.

In some demonstrative embodiments, the first BT SR link 166 may include a first eSCO link, e.g., according to the HFP.

In some demonstrative embodiments, the second BT SR link 186 may include a second eSCO link, e.g., according to the HFP.

In other embodiments, BT SR link 186 and/or BT SR link 166 may include any other type of BT link.

In some demonstrative embodiments, devices 102 and/or 140 may be configured to communicate full-duplex voice traffic over the P2P voice link, e.g., as described below.

In some demonstrative embodiments, devices 102 and/or 140 may communicate the full-duplex voice traffic over the BT LR link 126 at a transmission rate of 500 kilobit per second (kbps), e.g., as described below.

In other embodiments, devices 102 and/or 140 may communicate the full-duplex voice traffic over the BT LR link 126 at any other transmission rate.

In some demonstrative embodiments, controller 124 may be configured to control, cause, trigger and/or instruct device 102 to communicate the full-duplex voice traffic at a rate of 500 kbps over the BT LR link 126, e.g., as described below.

In some demonstrative embodiments, devices 102 and/or 140 may be configured to communicate half-duplex voice traffic over the P2P voice link, e.g., as described below.

In some demonstrative embodiments, devices 102 and/or 140 may communicate the half-duplex voice traffic over the BT LR link 126 at a transmission rate of 125 kbps, e.g., as described below.

In some demonstrative embodiments, controller 124 may be configured to control, cause, trigger and/or instruct device 102 to communicate half-duplex voice traffic over the BT LR link 126 at a rate of 125 kbps, e.g., as described below.

In some demonstrative embodiments, devices 102 and/or 140 may be configured to communicate one or more transmissions of the half-duplex voice traffic over the P2P voice link according to a first transmission rate, and/or to communicate one or more retransmissions of the half-duplex voice traffic according to a second, e.g., different, retransmission rate, e.g., as described below.

In some demonstrative embodiments, the first transmission rate may include a transmission rate of 500 kbps, and/or the second retransmission rate may include a retransmission rate of 125 kbps, e.g., as described below.

In other embodiments, devices 102 and/or 140 may communicate the half-duplex voice traffic over the P2P voice link at any other, common or different, transmission and/or retransmission rates.

In some demonstrative embodiments, controller 124 may be configured to control, cause, trigger and/or instruct device 102 to communicate the half-duplex voice traffic over the BT LR link 126, for example, by communicating the BT LR packet 127 at a first transmission rate, e.g., a transmission rate of 500 kbps, and by communicating a retransmission of the BT LR packet 127 over the BT LR link 126 at a second retransmission rate, e.g., a retransmission rate of 125 kbps, e.g., as described below.

In other embodiments, devices 102 and/or 140 may be configured to communicate any other voice traffic at any other transmission rate.

Figure 2:
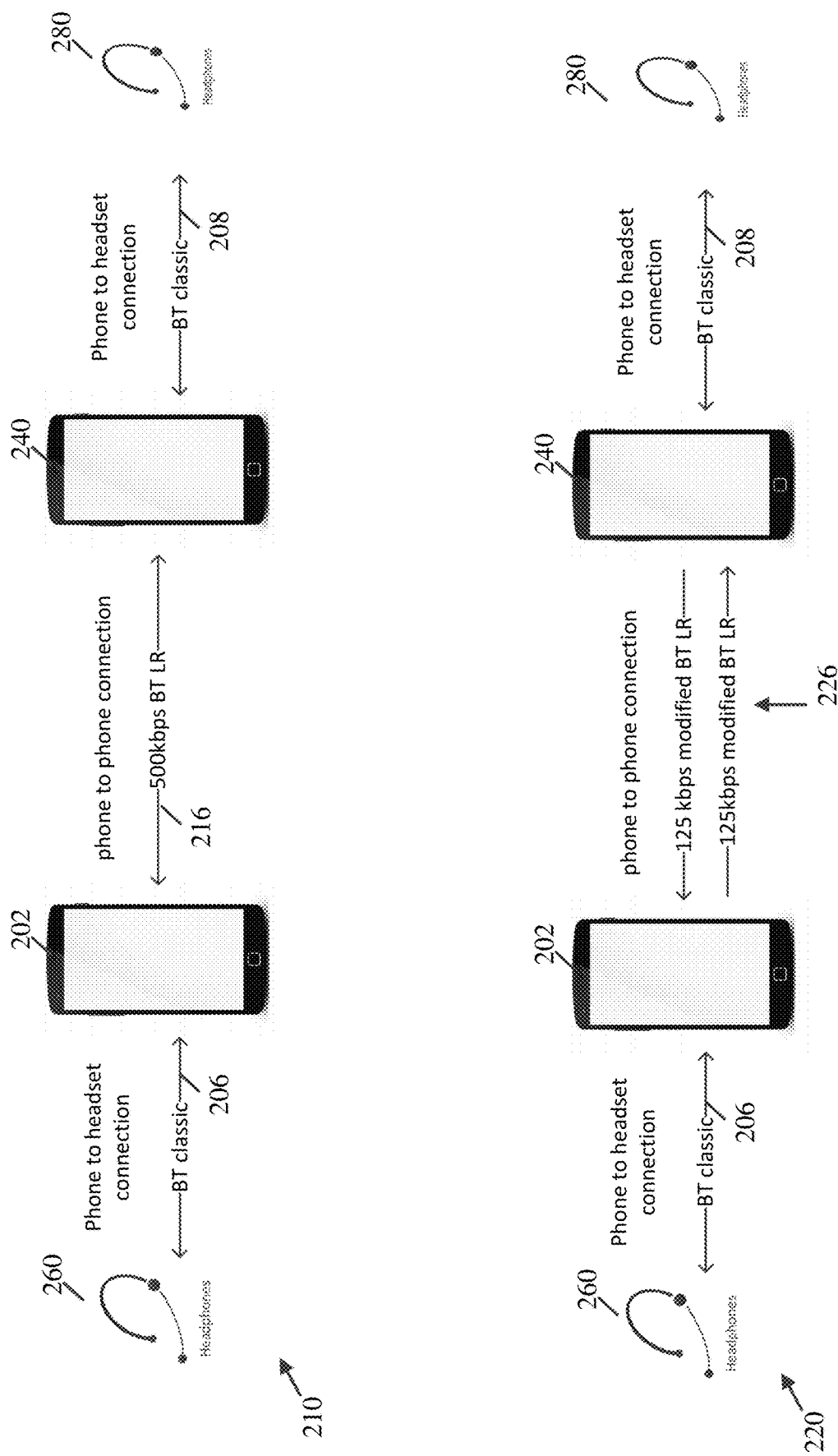
FIG. 2 is a schematic illustration of a first Point-to-Point (P2P) voice link and a second P2P voice link, in accordance with some demonstrative embodiments.

Reference is made to FIG. 2, which schematically illustrates a first P2P voice link 210 and a second P2P voice link 220, in accordance with some demonstrative embodiments.

In some demonstrative embodiments, as shown in FIG. 2, P2P voice links 210 and 220 may include a voice link between a first BT audio device 260, e.g., a first headset, and a second BT audio device 280, e.g., a second headset, via a first BT mobile device 202 and a second BT mobile device 240. For example, device 160 (FIG. 1) may perform one or more operations of, the functionality of, and/or the role of, BT audio device 260; device 102 (FIG. 1) may perform one or more operations of, the functionality of, and/or the role of, BT mobile device 202; device 140 (FIG. 1) may perform one or more operations of, the functionality of, and/or the role of, BT mobile device 240; and/or device 180 (FIG. 1) may perform one or more operations of, the functionality of, and/or the role of, BT audio device 280.

In some demonstrative embodiments, as shown in FIG. 2, P2P voice link 210 may include a first BT SR link 206, e.g., a standard or classic BT voice call, between a mobile phone and a headset, e.g., between devices 202 and 260. For example, BT SR link 206 may include an eSCO link according to the HFP, or any other SR link.

In some demonstrative embodiments, as shown in FIG. 2, P2P voice link 210 may include a second BT SR link 208, e.g., a standard or classic BT voice call, between a mobile phone and a headset, e.g., between devices 240 and 280. For example, BT SR link 208 may include an eSCO link according to the HFP, or any other SR link.

In some demonstrative embodiments, as shown in FIG. 2, P2P voice link 210 may be configured to communicate full-duplex voice traffic 216 over a BT LR link, for example, between devices 202 and 240.

In some demonstrative embodiments, as shown in FIG. 2, devices 202 and 240 may communicate the full-duplex voice traffic 216 over the BT LR link at a rate of 500 kbps, e.g., as described below.

In some demonstrative embodiments, P2P voice link 220 may include the BT SR links 206 and 208, e.g., the standard or classic BT voice call, between the mobile phone and the headset, e.g., between devices 260 and 202 or between devices 240 and 280.

In some demonstrative embodiments, P2P voice link 220 may be configured to communicate half-duplex voice traffic 226, e.g., at a PTT mode, for example, over the BT LR link between devices 202 and 240.

In some demonstrative embodiments, as shown in FIG. 2, devices 202 and 240 may communicate the half-duplex voice traffic 226 at a rate of 125 kbps, e.g., as described below.

In some demonstrative embodiments, as shown in FIG. 2, communication f the half-duplex voice traffic 226 may include communication of first voice traffic from device 202 to device 240, e.g., at the rate of 125 kbps; and/or communication of second voice traffic from device 240 to device 202, e.g., at the rate of 125 kbps.

In other embodiments, any other transmission rates may be implemented for P2P voice links 210 and/or 220.

Referring back to FIG. 1, in some demonstrative embodiments, devices 102 and/or 140 may be configured to allocate a plurality of SR time slots of an SR link connection period as an LR communication period, for example, for communication of BT LR packets, e.g., including BT LR packet 127 over the BT LR link 126, e.g., as described below.

In some demonstrative embodiments, devices 102 and/or 140 may be configured to allocate a plurality of first SR time slots of the SR link connection period to communicate the BT LR packets; and/or to communicate one or more BT SR packets over one or more second SR time slots of the SR link connection period, e.g., as described below.

In some demonstrative embodiments, controller 124 may be configured to control, cause, trigger and/or instruct device 102 to allocate a plurality of first SR time slots of an SR link connection period, as an LR communication period for communication over the BT LR link 126, e.g., as described below.

In some demonstrative embodiments, controller 124 may be configured to control, cause, trigger and/or instruct device 102 to communicate the BT LR packet 127 during the LR communication period, e.g., as described below.

In some demonstrative embodiments, controller 124 may be configured to control, cause, trigger and/or instruct device 102 to communicate the BT SR packet 167 over one or more second SR time slots of the SR link connection period, e.g., as described below.

In some demonstrative embodiments, controller 154 may be configured to control, cause, trigger and/or instruct device 140 to allocate the plurality of first SR time slots of the SR link connection period, as the LR communication period for the communication over the BT LR link 126, e.g., as described below.

In some demonstrative embodiments, controller 154 may be configured to control, cause, trigger and/or instruct device 140 to communicate, e.g., with device 102, the BT LR packet 127, during the LR communication period, e.g., as described below.

In some demonstrative embodiments, controller 154 may be configured to control, cause, trigger and/or instruct device 140 to communicate the BT SR packet 187 over the one or more second SR time slots of the SR link connection period, e.g., as described below.

In some demonstrative embodiments, the SR link connection period may include twelve SR time slots, e.g., as described below.

In other embodiments, the SR link connection period may include any other number of SR time slots.

In some demonstrative embodiments, the plurality of first SR time slots allocated as the LR communication period may include eight SR time slots, and the one or more second SR time slots may include four SR time slots, e.g., as described below.

In some demonstrative embodiments, the plurality of first SR time slots allocated as the LR communication period may include ten SR time slots, and the one or more second SR time slots may include two SR time slots, e.g., as described below.

In other embodiments, the plurality of first SR time slots allocated as the LR communication period may include any other number of SR time slots, and/or the one or more second SR time slots may include any other number of SR time slots, e.g., as described below.

In some demonstrative embodiments, devices 102 and/or 140 may be configured to communicate full-duplex voice traffic over the BT LR link 126, e.g., as described below.

In some demonstrative embodiments, devices 102 and/or 140 may allocate and/or use one or more SR time slots from the plurality of first SR time slots, for example, to communicate the full-duplex voice traffic over the BT LR link 126, e.g., as described below.

In some demonstrative embodiments, controller 124 may be configured to control, cause, trigger and/or instruct device 102 to communicate full-duplex voice traffic over the BT LR link 126, e.g., as described below.

In some demonstrative embodiments, controller 124 may be configured to control, cause, trigger and/or instruct device 102 to allocate one or more first SR time slots from the plurality of first SR time slots to an LR transmit time slot, e.g., to transmit a transmission to device 140; to allocate one or more second SR time slots from the plurality of first SR time slots to a first LR receive time slot, e.g., to receive a transmission from device 140; to allocate one or more third SR time slots from the plurality of first SR time slots to an LR re-transmit time slot, e.g., to retransmit a transmission to device 140; and/or to allocate one or more fourth SR time slots from the plurality of first SR time slots to a second LR receive time slot, for example, to receive a retransmission from device 140, e.g., as described below.

In some demonstrative embodiments, the LR transmit time slot may include a 500 kbps LR transmit time-slot, the first LR receive time slot may include a first 500 kbps LR receive time-slot, the LR re-transmit time slot may include a 500 kbps LR retransmit time-slot, and/or the second LR receive time slot may include a second 500 kbps LR receive time-slot, e.g., as described below.

In other embodiments, the plurality of first SR time slots may be allocated for communication of the full duplex voice traffic according to any other allocation scheme.

In some demonstrative embodiments, devices 102 and/or 140 may communicate half-duplex voice traffic over the BT LR link 126, e.g., as described below.

In some demonstrative embodiments, devices 102 and/or 140 may allocate one or more SR time slots from the plurality of first SR time slots, for example, to communicate the half-duplex voice traffic over the BT LR link 126, e.g., as described below.

In some demonstrative embodiments, controller 124 may be configured to control, cause, trigger and/or instruct device 102 to communicate half-duplex voice traffic over the BT LR link 126, e.g., as described below.

In some demonstrative embodiments, controller 124 may be configured to control, cause, trigger and/or instruct device 102 to allocate one or more first SR time slots from the plurality of first SR time slots to an LR transmit time slot; to allocate one or more second SR time slots from the plurality of first SR time slots to an Acknowledge (Ack) time slot; and/or to allocate one or more third SR time slots from the plurality of first SR time slots to an LR re-transmit timeslot, e.g., as described below.

In some demonstrative embodiments, the LR transmit time slot may include a 500 kbps LR transmit time slot, the Ack time slot may include a 125 kbps Ack time slot, and/or the LR re-transmit time slot may include a 125 kbps re-transmit time slot, e.g., as described below.

In some demonstrative embodiments, the LR transmit time slot may include a 125 kbps LR transmit time slot, the Ack time slot may include a 125 kbps Ack time slot, and/or the LR re-transmit time slot may include a 125 kbps re-transmit time slot, e.g., as described below.

In other embodiments, the plurality of first SR time slots may be allocated for communication of the half duplex voice traffic according to any other allocation scheme.

Figure 3:
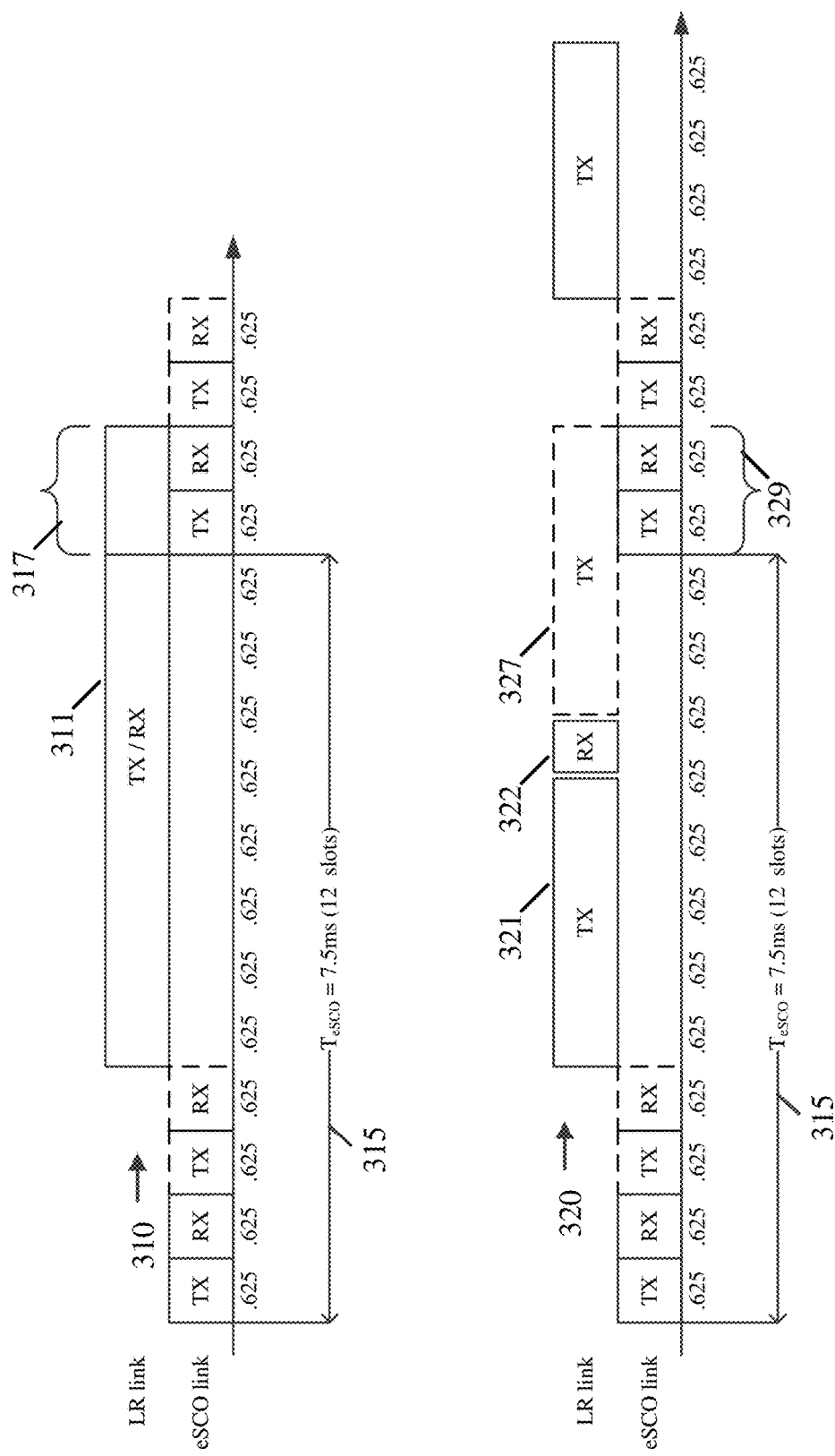
FIG. 3 is a schematic illustration of a first allocation of Short-Range (SR) time slots of an SR link connection period, and a second allocation of the SR time slots of the SR link connection period, in accordance with some demonstrative embodiments.

Reference is made to FIG. 3, which schematically illustrates a first allocation 310 of SR time slots of an SR link connection period 315, and a second allocation 320 of the SR time slots of the SR link connection period 315, in accordance with some demonstrative embodiments.

In one example, devices 102 and/or 140 (FIG. 1) may be configured to allocate a plurality of SR time slots of SR link connection period 315 as an LR communication period according to allocation 310 and/or allocation 320, e.g., as described below.

In some demonstrative embodiments, devices 102 and/or 140 (FIG. 1) may communicate BT LR packet 127 (FIG. 1), for example, using allocation 310 and/or allocation 320, e.g., as described below.

In some demonstrative embodiments, as shown in FIG. 3, allocation 310 may include a plurality of SR time slots of the SR link connection period 315 allocated as an LR transmit/receive time slot 311, e.g., for communication over a BT LR link, e.g., for communication over BT LR link 126 (FIG. 1).

In some demonstrative embodiments, as shown in FIG. 3, allocation 320 may include a plurality of SR time slots of the SR link connection period 315 allocated as an LR transmit time slot 321, a receive time slot 322, and a re-transmit time slot 327, e.g., for communication over the BT LR link, e.g., for communication over BT LR link 126 (FIG. 1).

In some demonstrative embodiments, as shown in FIG. 3, SR link connection period 315 may have a duration of 7.2 ms. For example, SR link connection period 315 may include twelve time slots, e.g., each having a duration of 0.625 ms.

In one example, a configuration of a BT SR link for a BT voice call, e.g., an eSCO link according to the HFP, may include up to six SR time slots every twelve SR slots for retransmission, e.g., considering a maximal latency for the BT SR link. For example, 3.75 ms may be allocated every 7.5 ms to the eSCO link.

In one example, two of the six SR time slots may be allocated to transmit or receive slots and/or four of the six SR time slots may include retransmission time slots, e.g., to transmit or receive a retransmission.

In some demonstrative embodiments, as shown in FIG. 3, a pair of time slots 317 may be allocated to an LR retransmit time slot and an LR receive time slot, for example, to accommodate a retransmission over the BT LR link.

In some demonstrative embodiments, as shown in FIG. 3, allocation of SR time slots for transmissions over the BT LR link, e.g., according to allocation 310 and/or allocation 320, may still allow to leave a period, e.g., of 5 ms every 7.5 ms, e.g., in a worst case scenario, for example, when a BT SR link, for example, BT SR link 206 (FIG. 2), e.g., a phone to headset or car kit connection, uses the retransmission slot.

In one example, a bitrate of a voice Compression/Decompression (CODEC) may be 32 kbps, and the LR link may be used, for example, to transport 30 bytes every 7.5 ms, for example, to keep feeding the phone to headset connection.

In some demonstrative embodiments, as shown in FIG. 3, an eSCO reserved slot 329 may be used and/or sacrificed, for example to enable an LR link retransmission 327.

In some demonstrative embodiments, for example, when there is no need for LR link retransmission 327, the eSCO reserved slot 329 may be allocated, for example, to an LE control channel, e.g., for Push-to-Talk synchronization and/or channel map updates, or for any other purpose.

Referring back to FIG. 1, in some demonstrative embodiments, in some use cases, devices 102 and/or 140 may be configured to utilize BT LR packet 127 having a modified and/or customized format, e.g., compared to a standard BT LR packet format, for example, to support a BT LR voice link, for example, at 125 kbps, or any other rate, e.g., as described below.

In some demonstrative embodiments, BT LR packet 127 may include a CRC field having a length of 16 bits, e.g., compared to a standard BT LR packet having a CRC length of 24 bits, e.g., as described below.

In some demonstrative embodiments, BT LR packet 127 may not include a length field in a header, e.g., compared to a standard BT LR packet, in which the length field is mandatory in the header of the standard BT LR packet, e.g., as described below.

In some demonstrative embodiments, controller 124 may be configured to control, cause, trigger and/or instruct device 102 to exclude a length field from a header of the BT LR packet 127, e.g., as described below.

In some demonstrative embodiments, BT LR packet 127 may not include a Message Integrity Check (MIC) field, e.g., compared to a standard BT LR packet, in which the MIC field is mandatory, e.g., as described below.

In some demonstrative embodiments, controller 124 may be configured to control, cause, trigger and/or instruct device 102 to exclude a MIC field from the BT LR packet 127, e.g., as described below.

Figure 4:
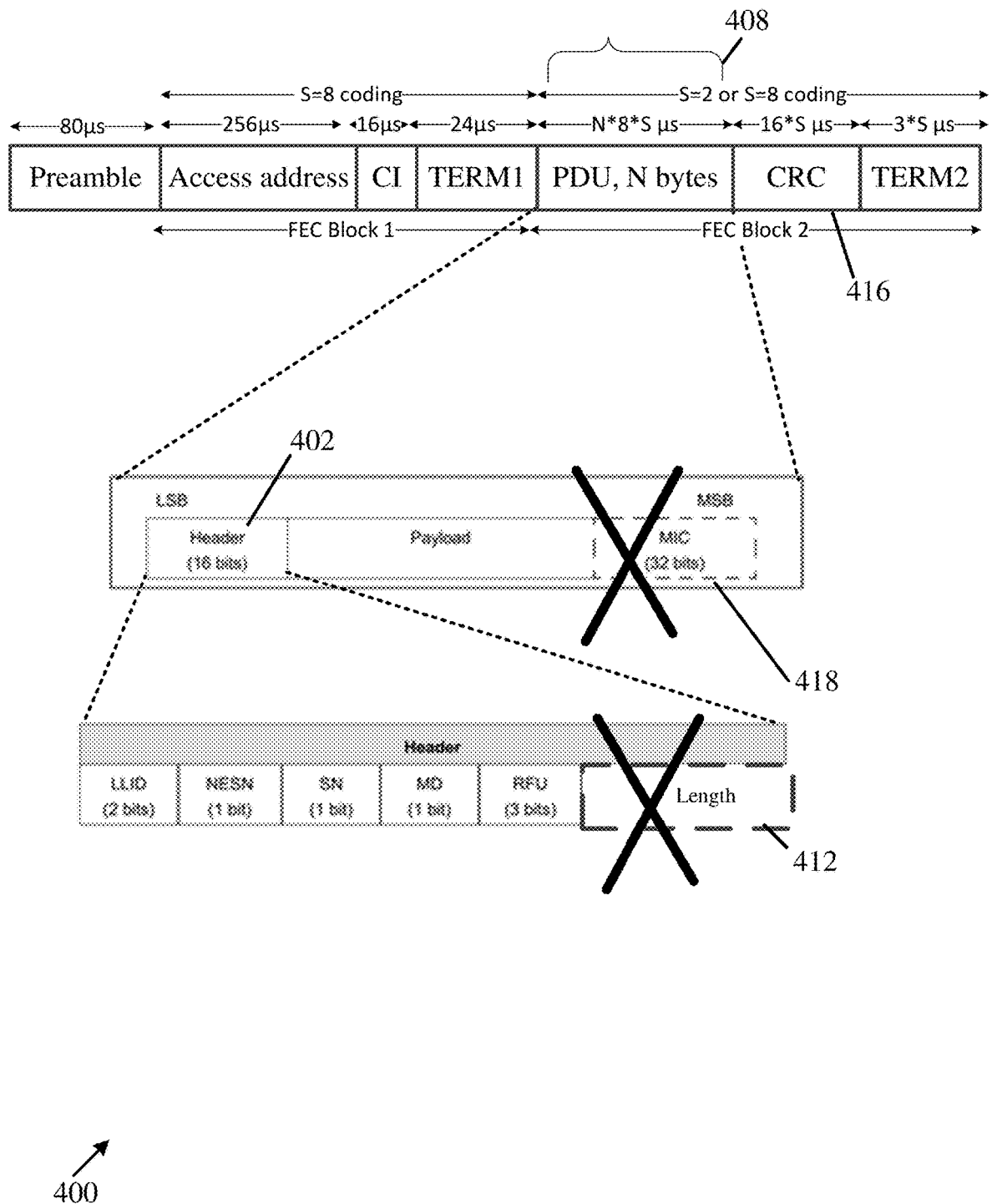
FIG. 4 is a schematic illustration of a format of a Bluetooth (BT) Long-Range (LR) packet, in accordance with some demonstrative embodiments.

Reference is made to FIG. 4, which schematically illustrates a format of BT LR packet 400, in accordance with some demonstrative embodiments.

In some demonstrative embodiments, devices 102 and 140 (FIG. 1) may be configured to communicate BT LR packet 127 (FIG. 1) having the format of BT LR packet 400.

In some demonstrative embodiments, as shown in FIG. 4, BT LR packet 400 may include a CRC field 416 having a length of 16 bits.

In one example, as a payload for a voice packet may have a fixed, short size length, e.g., of 30 bytes or any other length, the CRC field can be shortened, for example, to a size of 16 bits or any other size, e.g., compared to a CRC field of 24 bits in a standard BT LR packet format.

In some demonstrative embodiments, as shown in FIG. 4, BT LR packet 400 may include a payload field 408, which does not include a MIC field 418.

In one example, there may not be a need for a MIC authentication field for voice over LR, for example, similar to an eSCO packet, which does not include a MIC authentication field. For example, the MIC field 418 may not be accounted for packet size calculations.

In some demonstrative embodiments, as shown in FIG. 4, BT LR packet 400 may include a header field 402, which does not include a length field 412.

In one example, a Data channel PDU to transport an LR packet may include an 8-bit length field encapsulated in a 16-bit header. However, a size of a voice packet may be fixed and known and, therefore, the length field 412 may be unnecessary and excluded from BT LR packet 400.

In some demonstrative embodiments, lengths of one or more fields of BT LR packet 400 may be configured, for example, to support voice transport over a BT LR link, for example, considering a 32 Kbps LC3 BT SIG voice CODEC, e.g., as follows:

TABLE 1

| | Portion of the packet | | | | | |
|---|---|---|---|---|---|---|
| | 125 kbps regular packet | 500 kbps regular packet | 125 kbps regular Ack | 125 kbps regular Ack | 125 kbps Modified packet | 125 kbps Modified Ack |
| Packet overhead (packet header + CRC + | 592 | 430 | 592 | 430 | 528 | 528 |

TABLE 1-continued

| | Portion of the packet | | | | | |
|---|---|---|---|---|---|---|
| | 125 kbps regular packet | 500 kbps regular packet | 125 kbps regular Ack | 125 kbps regular Ack | 125 kbps Modified packet | 125 kbps Modified Ack |
| TERM2) (us) | | | | | | |
| Payload header (us) | 128 | 32 | 128 | 32 | 64 | 64 |
| Payload (us) | 1920 | 480 | 0 | 0 | 1920 | 0 |
| Total microseconds (us) | 2640 | 942 | 720 | 462 | 2512 | 592 |
| Total milliseconds (ms) | 2.64 | 0.942 | 0.72 | 0.462 | 2.512 | 0.592 |

In one example, Column 2 of Table 1 includes length values of a conventional BT LR packet format for a lowest throughput (125 kbps).

In some demonstrative embodiments, one or more length values of a BT LR packet, e.g., BT LR packet 400, may be determined, for example, based on length values in Column 6 of Table 1.

In some demonstrative embodiments, one or more length values of a BT ACK may be determined, for example, based on length values in Column 7 of Table 1.

In some demonstrative embodiments, there may be one or more use cases, which may be supported, for example, based on the configurations of Table 1, e.g., as follows:

TABLE 2

| Use case | Time (ms) | Slot count | comments |
|---|---|---|---|
| S = 8 (125 kbps); 32 kbps; unidirectional + retransmission; | 6.3 | 12 | May not be feasible, for example, if 12 slots cannot be allocated to the BT LR link |
| S = 2 (500 kbps); 32 kbps; unidirectional + retransmission; | 2.796 | 6 | PTT with one retransmission & eSCO retransmission slots = 4 |
| Tx as S = 2; Re-Tx at S = 8; 32 kbps, hybrid; unidirectional + retransmission; | 4.494 | 8 | Possibly proprietary mode - try first with 500 kbps and then with 125 kbps |
| S = 2 (500 kbps); 32 kbps; bidirectional + retransmission; | 4.368 | 8 | |
| S = 8 (500 kbps); 32 kbps; unidirectional + retransmission; Modified LR packet | 6.066 | 10 | |
| S = 8 (500 kbps); 32 kbps; bidirectional + no-retransmission; Modified LR packet | 5.324 | 10 | very less flexibility as LR link retransmission time for other activities cannot be reused |

Figure 5:
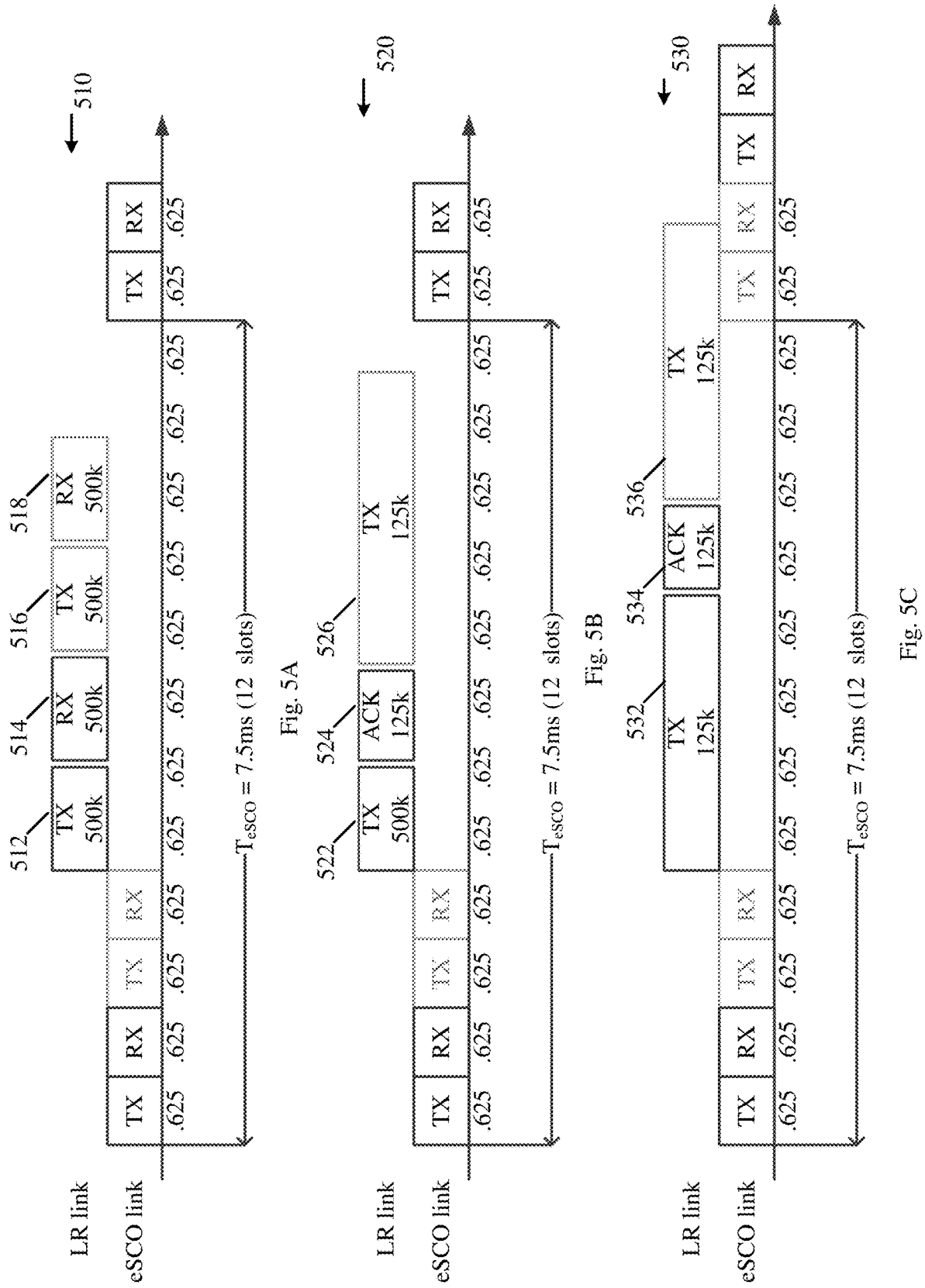
FIG. 5A is a schematic illustration of an allocation of time slots for a P2P voice link, in accordance with some demonstrative embodiments.
FIG. 5B is a schematic illustration of an allocation of time slots for a P2P voice link, in accordance with some demonstrative embodiments.
FIG. 5C is a schematic illustration of an allocation of time slots for a P2P voice link, in accordance with some demonstrative embodiments.

Reference is made to FIG. 5A, which schematically illustrates an allocation 510 of time slots for a first P2P voice link, in accordance with some demonstrative embodiments.

In one example, the first P2P voice link may be configured for communication of full-duplex voice traffic at a rate of 500 kbps, e.g., corresponding to one or more parameters in Row 4 of Table 2.

In some demonstrative embodiments, as shown in FIG. 5A, allocation 510 may include a 500 kbps LR transmit time-slot 512, a first 500 kbps LR receive time-slot 514, a 500 kbps LR retransmit time-slot 516, and/or a second 500 kbps LR receive time-slot 518.

In one example, a 500 kbps coded PHY may be used, for example, to support full-duplex phone-to-phone operation with a single retransmission. For example, a 32 kbps BT SIG CODEC may be used for the full-duplex voice traffic.

Reference is made to FIG. 5B, which schematically illustrates an allocation 520 of time slots for a second P2P voice link, in accordance with some demonstrative embodiments.

In one example, the second P2P voice link may be configured for communication of half-duplex voice traffic at a transmission rate of 500 kbps, and/or at a retransmission rate of 125 kbps, e.g., corresponding to one or more parameters in Row 3 of Table 2.

In some demonstrative embodiments, as shown in FIG. 5B, allocation 520 may include a 500 kbps LR transmit time slot 522, a 125 kbps Ack slot 524, and/or a 125 kbps re-transmit time slot 526.

In one example, a phone-to-phone transmission may be transmitted at a first rate of 500 kpbs. If a retransmission is needed, a second rate, e.g., a rate of 125 kbps PHY may be used, for example, to maximize a probability of a successful transmission.

For example, a 32 kbps BT SIG CODEC may be used for the half-duplex voice traffic.

Reference is made to FIG. 5C, which schematically illustrate an allocation 530 of time slots for a third P2P voice link, in accordance with some demonstrative embodiments.

In one example, the third P2P voice link may be configured for communication of half-duplex voice traffic, e.g., a PTT link, at a rate of 125 kbps, e.g., corresponding to one or more parameters in Row 5 of Table 2.

In some demonstrative embodiments, as shown in FIG. 5C, allocation 530 may include a 125 kbps LR transmit time slot 532, a 125 kbps Ack slot 534, and/or a 125 kbps re-transmit time slot 536.

In one example, the third P2P voice link may maximize a communication range, for example, using a customized version of the 125 kps coded PHY, e.g., using BT LR packet 400 (FIG. 4).

For example, to accommodate voice traffic while featuring one retransmission, a CRC field, e.g., CRC field 402, may be reduced from 24 bits to 16 bits, for example, while the length field may be excluded from a PDU header, e.g., header 402 (FIG. 4). If a retransmission is needed on the BT LR link, SR time slots of an eSCO link retransmission may be automatically used.

For example, a 32 kbps BT SIG CODEC may be used for the half-duplex voice traffic.

In some demonstrative embodiments, device 102 (FIG. 1) may be configured to switch between allocations 520 and 530, for example, based on a quality of the P2P voice link and/or any other criteria.

Figure 6:
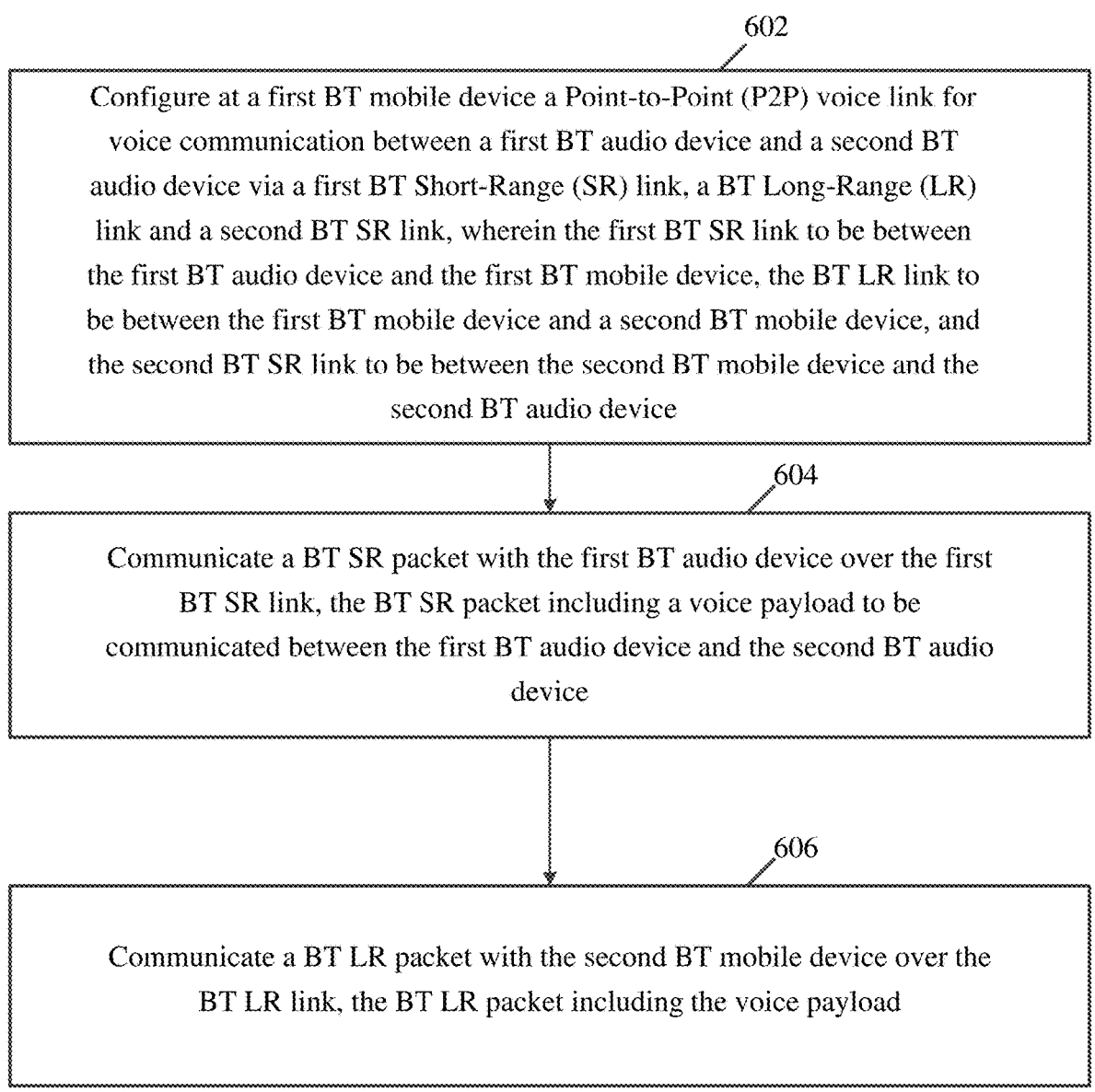
FIG. 6 is a schematic flow-chart illustration of a method of communicating voice traffic over a Bluetooth link, in accordance with some demonstrative embodiments.

Reference is made to FIG. 6, which schematically illustrates a method of communicating voice traffic over a BT link, in accordance with some demonstrative embodiments. For example, one or more of the operations of the method of FIG. 6 may be performed by one or more elements of a system, e.g., system 100 (FIG. 1), for example, one or more wireless devices, e.g., device 102 (FIG. 1), device 140 (FIG. 1), device 160 (FIG. 1) and/or device 180 (FIG. 1), a BT radio, e.g., radio 114 (FIG. 1) and/or radio 144 (FIG. 1), a receiver, e.g., receiver 116 (FIG. 1) and/or receiver 146 (FIG. 1), a controller, e.g., controller 124 (FIG. 1) and/or controller 154 (FIG. 1), and/or a message processor, e.g., message processor 128 (FIG. 1) and/or message processor 158 (FIG. 1).

As indicated at block 602, the method may include configuring a Point-to-Point (P2P) voice link for voice communication between a first BT audio device and a second BT audio device via a first BT Short-Range (SR) link, a BT Long-Range (LR) link and a second BT SR link, wherein the first BT SR link to be between the first BT audio device and the first BT mobile device, the BT LR link to be between the first BT mobile device and a second BT mobile device, and the second BT SR link to be between the second BT mobile device and the second BT audio device. For example, controller 124 (FIG. 1) may be configured to control, cause, trigger and/or instruct device 102 (FIG. 1) to configure the P2P voice link for voice communication between devices 160 and 180 (FIG. 1) via the first BT link 166 (FIG. 1), the BT LR link 126 (FIG. 1), and the second BT SR link 186 (FIG. 1), e.g., as described above.

As indicated at block 604, the method may include communicating a BT SR packet with the first BT audio device over the first BT SR link, the BT SR packet including a voice payload to be communicated between the first BT audio device and the second BT audio device. For example, controller 124 (FIG. 1) may be configured to control, cause, trigger and/or instruct device 102 (FIG. 1) to communicate the BT SR packet 167 (FIG. 1) with device 160 (FIG. 1) over the first BT SR link 166 (FIG. 1), the BT SR packet 167 (FIG. 1) including the voice payload to be communicated between devices 160 and 180 (FIG. 1), e.g., as described above.

As indicated at block 606, the method may include communicating a BT LR packet with the second BT mobile device over the BT LR link, the BT LR packet including the voice payload. For example, controller 124 (FIG. 1) may be configured to control, cause, trigger and/or instruct device 102 (FIG. 1) to communicating the BT LR packet 127 (FIG. 1) with device 140 (FIG. 1) over the BT LR link 126 (FIG. 1), the BT LR packet 127 (FIG. 1) including the voice payload, e.g., as described above.

Figure 7:
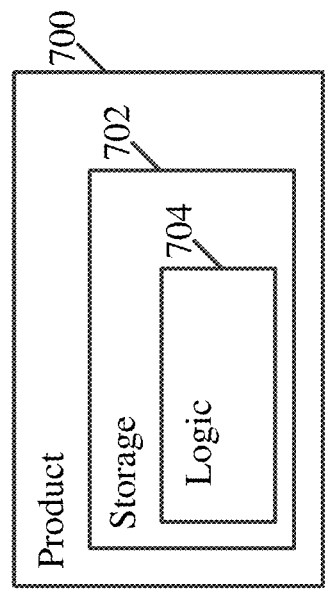
FIG. 7 is a schematic illustration of a product of manufacture, in accordance with some demonstrative embodiments.

Reference is made to FIG. 7, which schematically illustrates a product of manufacture 700, in accordance with some demonstrative embodiments. Product 700 may include one or more tangible computer-readable ("machine-readable") non-transitory storage media 702, which may include computer-executable instructions, e.g., implemented by logic 704, operable to, when executed by at least one computer processor, enable the at least one computer processor to implement one or more operations at device 102 (FIG. 1), device 140 (FIG. 1), device 160 (FIG. 1), device 180 (FIG. 1), BT radio 114 (FIG. 1), BT radio 144 (FIG. 1), controller 124 (FIG. 1), controller 154 (FIG. 1), receiver 116 (FIG. 1), transmitter 118 (FIG. 1), message processor 128 (FIG. 1), receiver 146 (FIG. 1), transmitter 158 (FIG. 1), and/or message processor 158 (FIG. 1), to cause device 102 (FIG. 1), device 140 (FIG. 1), device 160 (FIG. 1), device 180 (FIG. 1), BT radio 114 (FIG. 1), BT radio 144 (FIG. 1), controller 124 (FIG. 1), controller 154 (FIG. 1), receiver 116 (FIG. 1), transmitter 118 (FIG. 1), message processor 128 (FIG. 1), receiver 146 (FIG. 1), transmitter 158 (FIG. 1), and/or message processor 158 (FIG. 1) to perform, trigger and/or implement one or more operations and/or functionalities, and/or to perform, trigger and/or implement one or more operations and/or functionalities described with reference to the FIGS. 1, 2, 3, 4, 5, and/or 6, and/or one or more operations described herein. The phrases "non-transitory machine-readable medium" and "computer-readable non-transitory storage media" may be directed to include all computer-readable media, with the sole exception being a transitory propagating signal.

In some demonstrative embodiments, product 700 and/or machine-readable storage media 702 may include one or more types of computer-readable storage media capable of storing data, including volatile memory, non-volatile memory, removable or non-removable memory, erasable or non-erasable memory, writeable or rewriteable memory, and the like. For example, machine-readable storage media 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a first Bluetooth (BT) mobile device to configure a Point-to-Point (P2P) voice link for voice communication between a first BT audio device and a second BT audio device via a first BT Short-Range (SR) link, a BT Long-Range (LR) link and a second BT SR link, wherein the first BT SR link to be between the first BT audio device and the first BT mobile device, the BT LR link to be between the first BT mobile device and a second BT mobile device, and the second BT SR link to be between the second BT mobile device and the second BT audio device; communicate a BT SR packet with the first BT audio device over the first BT SR link, the BT SR packet comprising a voice payload to be communicated between the first BT audio device and the second BT audio device; and communicate a BT LR packet with the second BT mobile device over the BT LR link, the BT LR packet comprising the voice payload.

Example 2 includes the subject matter of Example 1, and optionally, wherein the apparatus is configured to cause the first BT mobile device to allocate a plurality of first SR time slots of an SR link connection period as an LR communication period for communication over the BT LR link, to communicate the BT LR packet during the LR communication period, and to communicate the BT SR packet over one or more second SR time slots of the SR link connection period.

Example 3 includes the subject matter of Example 2, and optionally, wherein the SR link connection period comprises twelve SR time slots, the LR communication period comprises ten SR time slots, and the one or more second SR time slots comprise two SR time slots.

Example 4 includes the subject matter of Example 2, and optionally, wherein the SR link connection period comprises twelve SR time slots, the LR communication period comprises eight SR time slots, and the one or more second SR time slots comprise four SR time slots.

Example 5 includes the subject matter of any one of Examples 2-4, and optionally, wherein the apparatus is configured to cause the first BT mobile device to communicate full-duplex voice traffic over the BT LR link, to allocate one or more first SR time slots from the plurality of first SR time slots to an LR transmit time slot, to allocate one or more second SR time slots from the plurality of first SR time slots to a first LR receive time slot, to allocate one or more third SR time slots from the plurality of first SR time slots to an LR re-transmit time slot, and to allocate one or more fourth SR time slots from the plurality of first SR time slots to a second LR receive time slot.

Example 6 includes the subject matter of any one of Examples 2-4, and optionally, wherein the apparatus is configured to cause the first BT mobile device to communicate half-duplex voice traffic over the BT LR link, to allocate one or more first SR time slots from the plurality of first SR time slots to an LR transmit time slot, to allocate one or more second SR time slots from the plurality of first SR time slots to an Acknowledge (Ack) time slot, and to allocate one or more third SR time slots from the plurality of first SR time slots to an LR re-transmit timeslot.

Example 7 includes the subject matter of Example 6, and optionally, wherein the LR transmit time slot comprises a 500 kilobit per second (kbps) LR transmit time slot, the Ack time slot comprises a 125 kbps Ack time slot, and the LR re-transmit time slot comprises a 125 kbps re-transmit time slot.

Example 8 includes the subject matter of Example 6, and optionally, wherein the LR transmit time slot comprises a 125 kilobit per second (kbps) LR transmit time slot, the Ack time slot comprises a 125 kbps Ack time slot, and the LR re-transmit time slot comprises a 125 kbps re-transmit time slot.

Example 9 includes the subject matter of any one of Examples 1-8, and optionally, wherein the BT LR packet comprises a Cyclic Redundancy Check (CRC) field having a length of 16 bits.

Example 10 includes the subject matter of any one of Examples 1-9, and optionally, wherein the apparatus is configured to cause the first BT mobile device to exclude a length field from a header of the BT LR packet.

Example 11 includes the subject matter of any one of Examples 1-10, and optionally, wherein the apparatus is configured to cause the first BT mobile device to exclude a Message Integrity Check (MIC) field from the BT LR packet.

Example 12 includes the subject matter of any one of Examples 1-11, and optionally, wherein the apparatus is configured to cause the first BT mobile device to communicate full-duplex voice traffic over the BT LR link at a rate of 500 kilobit per second (kbps).

Example 13 includes the subject matter of any one of Examples 1-11, and optionally, wherein the apparatus is configured to cause the first BT mobile device to communicate half-duplex voice traffic over the BT LR link at a rate of 125 kilobit per second (kbps).

Example 14 includes the subject matter of any one of Examples 1-11, and optionally, wherein the apparatus is configured to cause the first BT mobile device to communicate half-duplex voice traffic over the BT LR link by communicating the BT LR packet at a transmission rate of 500 kilobit per second (kbps), and communicating a retransmission of the BT LR packet over the BT LR link at a retransmission rate of 125 kbps.

Example 15 includes the subject matter of any one of Examples 1-14, and optionally, wherein the apparatus is configured to cause the first BT mobile device to receive the BT SR packet from the first BT audio device over the BT SR link, the voice payload is from the first BT audio device, and to transmit the BT LR packet to the second BT mobile device over the BT LR link.

Example 16 includes the subject matter of any one of Examples 1-14, and optionally, wherein the apparatus is configured to cause the first BT mobile device to receive the LR BT packet from the second BT mobile device over the BT LR link, the voice payload is from the second BT audio device, and to transmit the BT SR packet to the first BT audio device over the BT SR link.

Example 17 includes the subject matter of any one of Examples 1-16, and optionally, wherein the first BT audio device comprises a headset to be paired with the first BT mobile device.

Example 18 includes the subject matter of any one of Examples 1-17, and optionally, wherein the first BT SR link comprises an enhanced Synchronous Connection-Oriented (eSCO) link according to a Hands Free Profile (HFP).

Example 19 includes the subject matter of any one of Examples 1-18, and optionally, comprising a BT radio.

Example 20 includes the subject matter of any one of Examples 1-19, and optionally, comprising one or more antennas, a memory, and a processor.

Example 21 includes a system comprising a first Bluetooth (BT) mobile device, the first BT mobile device comprising one or more antennas; a BT radio; a memory; and a controller configured to cause the first BT mobile device to configure a Point-to-Point (P2P) voice link for voice communication between a first BT audio device and a second BT audio device via a first BT Short-Range (SR) link, a BT Long-Range (LR) link and a second BT SR link, wherein the first BT SR link to be between the first BT audio device and the first BT mobile device, the BT LR link to be between the first BT mobile device and a second BT mobile device, and the second BT SR link to be between the second BT mobile device and the second BT audio device; communicate a BT SR packet with the first BT audio device over the first BT SR link, the BT SR packet comprising a voice payload to be communicated between the first BT audio device and the second BT audio device; and communicate a BT LR packet with the second BT mobile device over the BT LR link, the BT LR packet comprising the voice payload.

Example 22 includes the subject matter of Example 21, and optionally, wherein the controller is configured to cause the first BT mobile device to allocate a plurality of first SR time slots of an SR link connection period as an LR communication period for communication over the BT LR link, to communicate the BT LR packet during the LR communication period, and to communicate the BT SR packet over one or more second SR time slots of the SR link connection period.

Example 23 includes the subject matter of Example 22, and optionally, wherein the SR link connection period comprises twelve SR time slots, the LR communication period comprises ten SR time slots, and the one or more second SR time slots comprise two SR time slots.

Example 24 includes the subject matter of Example 22, and optionally, wherein the SR link connection period comprises twelve SR time slots, the LR communication period comprises eight SR time slots, and the one or more second SR time slots comprise four SR time slots.

Example 25 includes the subject matter of any one of Examples 22-24, and optionally, wherein the controller is configured to cause the first BT mobile device to communicate full-duplex voice traffic over the BT LR link, to allocate one or more first SR time slots from the plurality of first SR time slots to an LR transmit time slot, to allocate one or more second SR time slots from the plurality of first SR time slots to a first LR receive time slot, to allocate one or more third SR time slots from the plurality of first SR time slots to an LR re-transmit time slot, and to allocate one or more fourth SR time slots from the plurality of first SR time slots to a second LR receive time slot.

Example 26 includes the subject matter of any one of Examples 22-24, and optionally, wherein the controller is configured to cause the first BT mobile device to communicate half-duplex voice traffic over the BT LR link, to allocate one or more first SR time slots from the plurality of first SR time slots to an LR transmit time slot, to allocate one or more second SR time slots from the plurality of first SR time slots to an Acknowledge (Ack) time slot, and to allocate one or more third SR time slots from the plurality of first SR time slots to an LR re-transmit timeslot.

Example 27 includes the subject matter of Example 26, and optionally, wherein the LR transmit time slot comprises a 500 kilobit per second (kbps) LR transmit time slot, the Ack time slot comprises a 125 kbps Ack time slot, and the LR re-transmit time slot comprises a 125 kbps re-transmit time slot.

Example 28 includes the subject matter of Example 26, and optionally, wherein the LR transmit time slot comprises a 125 kilobit per second (kbps) LR transmit time slot, the Ack time slot comprises a 125 kbps Ack time slot, and the LR re-transmit time slot comprises a 125 kbps re-transmit time slot.

Example 29 includes the subject matter of any one of Examples 21-28, and optionally, wherein the BT LR packet comprises a Cyclic Redundancy Check (CRC) field having a length of 16 bits.

Example 30 includes the subject matter of any one of Examples 21-29, and optionally, wherein the controller is configured to cause the first BT mobile device to exclude a length field from a header of the BT LR packet.

Example 31 includes the subject matter of any one of Examples 21-30, and optionally, wherein the controller is configured to cause the first BT mobile device to exclude a Message Integrity Check (MIC) field from the BT LR packet.

Example 32 includes the subject matter of any one of Examples 21-31, and optionally, wherein the controller is configured to cause the first BT mobile device to communicate full-duplex voice traffic over the BT LR link at a rate of 500 kilobit per second (kbps).

Example 33 includes the subject matter of any one of Examples 21-31, and optionally, wherein the controller is configured to cause the first BT mobile device to communicate half-duplex voice traffic over the BT LR link at a rate of 125 kilobit per second (kbps).

Example 34 includes the subject matter of any one of Examples 21-31, and optionally, wherein the controller is configured to cause the first BT mobile device to communicate half-duplex voice traffic over the BT LR link by communicating the BT LR packet at a transmission rate of 500 kilobit per second (kbps), and communicating a retransmission of the BT LR packet over the BT LR link at a retransmission rate of 125 kbps.

Example 35 includes the subject matter of any one of Examples 21-34, and optionally, wherein the controller is configured to cause the first BT mobile device to receive the BT SR packet from the first BT audio device over the BT SR link, the voice payload is from the first BT audio device, and to transmit the BT LR packet to the second BT mobile device over the BT LR link.

Example 36 includes the subject matter of any one of Examples 21-34, and optionally, wherein the controller is configured to cause the first BT mobile device to receive the LR BT packet from the second BT mobile device over the BT LR link, the voice payload is from the second BT audio device, and to transmit the BT SR packet to the first BT audio device over the BT SR link.

Example 37 includes the subject matter of any one of Examples 21-36, and optionally, wherein the first BT audio device comprises a headset to be paired with the first BT mobile device.

Example 38 includes the subject matter of any one of Examples 21-37, and optionally, wherein the first BT SR link comprises an enhanced Synchronous Connection-Oriented (eSCO) link according to a Hands Free Profile (HFP).

Example 39 includes a method to be performed at a first Bluetooth (BT) mobile device, the method comprising configuring a Point-to-Point (P2P) voice link for voice communication between a first BT audio device and a second BT audio device via a first BT Short-Range (SR) link, a BT Long-Range (LR) link and a second BT SR link, wherein the first BT SR link to be between the first BT audio device and the first BT mobile device, the BT LR link to be between the first BT mobile device and a second BT mobile device, and the second BT SR link to be between the second BT mobile device and the second BT audio device; communicating a BT SR packet with the first BT audio device over the first BT SR link, the BT SR packet comprising a voice payload to be communicated between the first BT audio device and the second BT audio device; and communicating a BT LR packet with the second BT mobile device over the BT LR link, the BT LR packet comprising the voice payload.

Example 40 includes the subject matter of Example 39, and optionally, comprising allocating a plurality of first SR time slots of an SR link connection period as an LR communication period for communication over the BT LR link, communicating the BT LR packet during the LR communication period, and communicating the BT SR packet over one or more second SR time slots of the SR link connection period.

Example 41 includes the subject matter of Example 40, and optionally, wherein the SR link connection period comprises twelve SR time slots, the LR communication period comprises ten SR time slots, and the one or more second SR time slots comprise two SR time slots.

Example 42 includes the subject matter of Example 40, and optionally, wherein the SR link connection period comprises twelve SR time slots, the LR communication period comprises eight SR time slots, and the one or more second SR time slots comprise four SR time slots.

Example 43 includes the subject matter of any one of Examples 40-42, and optionally, comprising communicating full-duplex voice traffic over the BT LR link, allocating one or more first SR time slots from the plurality of first SR time slots to an LR transmit time slot, allocating one or more second SR time slots from the plurality of first SR time slots to a first LR receive time slot, allocating one or more third SR time slots from the plurality of first SR time slots to an LR re-transmit time slot, and allocating one or more fourth SR time slots from the plurality of first SR time slots to a second LR receive time slot.

Example 44 includes the subject matter of any one of Examples 40-43, and optionally, comprising communicating half-duplex voice traffic over the BT LR link, allocating one or more first SR time slots from the plurality of first SR time slots to an LR transmit time slot, allocating one or more second SR time slots from the plurality of first SR time slots to an Acknowledge (Ack) time slot, and allocating one or more third SR time slots from the plurality of first SR time slots to an LR re-transmit timeslot.

Example 45 includes the subject matter of Example 44, and optionally, wherein the LR transmit time slot comprises a 500 kilobit per second (kbps) LR transmit time slot, the Ack time slot comprises a 125 kbps Ack time slot, and the LR re-transmit time slot comprises a 125 kbps re-transmit time slot.

Example 46 includes the subject matter of Example 44, and optionally, wherein the LR transmit time slot comprises a 125 kilobit per second (kbps) LR transmit time slot, the Ack time slot comprises a 125 kbps Ack time slot, and the LR re-transmit time slot comprises a 125 kbps re-transmit time slot.

Example 47 includes the subject matter of any one of Examples 39-46, and optionally, wherein the BT LR packet comprises a Cyclic Redundancy Check (CRC) field having a length of 16 bits.

Example 48 includes the subject matter of any one of Examples 39-47, and optionally, comprising excluding a length field from a header of the BT LR packet.

Example 49 includes the subject matter of any one of Examples 39-48, and optionally, comprising excluding a Message Integrity Check (MIC) field from the BT LR packet.

Example 50 includes the subject matter of any one of Examples 39-49, and optionally, comprising communicating full-duplex voice traffic over the BT LR link at a rate of 500 kilobit per second (kbps).

Example 51 includes the subject matter of any one of Examples 39-50, and optionally, comprising communicating half-duplex voice traffic over the BT LR link at a rate of 125 kilobit per second (kbps).

Example 52 includes the subject matter of any one of Examples 39-50, and optionally, comprising communicating half-duplex voice traffic over the BT LR link by communicating the BT LR packet at a transmission rate of 500 kilobit per second (kbps), and communicating a retransmission of the BT LR packet over the BT LR link at a retransmission rate of 125 kbps.

Example 53 includes the subject matter of any one of Examples 39-52, and optionally, comprising receiving the BT SR packet from the first BT audio device over the BT SR link, the voice payload is from the first BT audio device, and transmitting the BT LR packet to the second BT mobile device over the BT LR link.

Example 54 includes the subject matter of any one of Examples 39-52, and optionally, comprising receiving the LR BT packet from the second BT mobile device over the BT LR link, the voice payload is from the second BT audio device, and transmitting the BT SR packet to the first BT audio device over the BT SR link.

Example 55 includes the subject matter of any one of Examples 39-54, and optionally, wherein the first BT audio device comprises a headset to be paired with the first BT mobile device.

Example 56 includes the subject matter of any one of Examples 39-55, and optionally, wherein the first BT SR link comprises an enhanced Synchronous Connection-Oriented (eSCO) link according to a Hands Free Profile (HFP).

Example 57 includes a product comprising one or more tangible computer-readable non-transitory storage media comprising computer-executable instructions operable to, when executed by at least one processor, enable the at least one processor to cause a first Bluetooth (BT) mobile device to configure a Point-to-Point (P2P) voice link for voice communication between a first BT audio device and a second BT audio device via a first BT Short-Range (SR) link, a BT Long-Range (LR) link and a second BT SR link, wherein the first BT SR link to be between the first BT audio device and the first BT mobile device, the BT LR link to be between the first BT mobile device and a second BT mobile device, and the second BT SR link to be between the second BT mobile device and the second BT audio device; communicate a BT SR packet with the first BT audio device over the first BT SR link, the BT SR packet comprising a voice payload to be communicated between the first BT audio device and the second BT audio device; and communicate a BT LR packet with the second BT mobile device over the BT LR link, the BT LR packet comprising the voice payload.

Example 58 includes the subject matter of Example 57, and optionally, wherein the instructions, when executed, cause the first BT mobile device to allocate a plurality of first SR time slots of an SR link connection period as an LR communication period for communication over the BT LR link, to communicate the BT LR packet during the LR communication period, and to communicate the BT SR packet over one or more second SR time slots of the SR link connection period.

Example 59 includes the subject matter of Example 58, and optionally, wherein the SR link connection period comprises twelve SR time slots, the LR communication period comprises ten SR time slots, and the one or more second SR time slots comprise two SR time slots.

Example 60 includes the subject matter of Example 58, and optionally, wherein the SR link connection period comprises twelve SR time slots, the LR communication period comprises eight SR time slots, and the one or more second SR time slots comprise four SR time slots.

Example 61 includes the subject matter of any one of Examples 58-60, and optionally, wherein the instructions, when executed, cause the first BT mobile device to communicate full-duplex voice traffic over the BT LR link, to allocate one or more first SR time slots from the plurality of first SR time slots to an LR transmit time slot, to allocate one or more second SR time slots from the plurality of first SR time slots to a first LR receive time slot, to allocate one or more third SR time slots from the plurality of first SR time slots to an LR re-transmit time slot, and to allocate one or more fourth SR time slots from the plurality of first SR time slots to a second LR receive time slot.

Example 62 includes the subject matter of any one of Examples 58-60, and optionally, wherein the instructions, when executed, cause the first BT mobile device to communicate half-duplex voice traffic over the BT LR link, to allocate one or more first SR time slots from the plurality of first SR time slots to an LR transmit time slot, to allocate one or more second SR time slots from the plurality of first SR time slots to an Acknowledge (Ack) time slot, and to allocate one or more third SR time slots from the plurality of first SR time slots to an LR re-transmit timeslot.

Example 63 includes the subject matter of Example 62, and optionally, wherein the LR transmit time slot comprises a 500 kilobit per second (kbps) LR transmit time slot, the Ack time slot comprises a 125 kbps Ack time slot, and the LR re-transmit time slot comprises a 125 kbps re-transmit time slot.

Example 64 includes the subject matter of Example 62, and optionally, wherein the LR transmit time slot comprises a 125 kilobit per second (kbps) LR transmit time slot, the Ack time slot comprises a 125 kbps Ack time slot, and the LR re-transmit time slot comprises a 125 kbps re-transmit time slot.

Example 65 includes the subject matter of any one of Examples 57-64, and optionally, wherein the BT LR packet comprises a Cyclic Redundancy Check (CRC) field having a length of 16 bits.

Example 66 includes the subject matter of any one of Examples 57-65, and optionally, wherein the instructions, when executed, cause the first BT mobile device to exclude a length field from a header of the BT LR packet.

Example 67 includes the subject matter of any one of Examples 57-66, and optionally, wherein the instructions, when executed, cause the first BT mobile device to exclude a Message Integrity Check (MIC) field from the BT LR packet.

Example 68 includes the subject matter of any one of Examples 57-67, and optionally, wherein the instructions, when executed, cause the first BT mobile device to communicate full-duplex voice traffic over the BT LR link at a rate of 500 kilobit per second (kbps).

Example 69 includes the subject matter of any one of Examples 57-68, and optionally, wherein the instructions, when executed, cause the first BT mobile device to communicate half-duplex voice traffic over the BT LR link at a rate of 125 kilobit per second (kbps).

Example 70 includes the subject matter of any one of Examples 57-69, and optionally, wherein the instructions, when executed, cause the first BT mobile device to communicate half-duplex voice traffic over the BT LR link by communicating the BT LR packet at a transmission rate of 500 kilobit per second (kbps), and communicating a retransmission of the BT LR packet over the BT LR link at a retransmission rate of 125 kbps.

Example 71 includes the subject matter of any one of Examples 57-70, and optionally, wherein the instructions, when executed, cause the first BT mobile device to receive the BT SR packet from the first BT audio device over the BT SR link, the voice payload is from the first BT audio device, and to transmit the BT LR packet to the second BT mobile device over the BT LR link.

Example 72 includes the subject matter of any one of Examples 57-70, and optionally, wherein the instructions, when executed, cause the first BT mobile device to receive the LR BT packet from the second BT mobile device over the BT LR link, the voice payload is from the second BT audio device, and to transmit the BT SR packet to the first BT audio device over the BT SR link.

Example 73 includes the subject matter of any one of Examples 57-72, and optionally, wherein the first BT audio device comprises a headset to be paired with the first BT mobile device.

Example 74 includes the subject matter of any one of Examples 57-73, and optionally, wherein the first BT SR link comprises an enhanced Synchronous Connection-Oriented (eSCO) link according to a Hands Free Profile (HFP).

Example 75 includes an apparatus of a first Bluetooth (BT) mobile device, the apparatus comprising means for configuring a Point-to-Point (P2P) voice link for voice communication between a first BT audio device and a second BT audio device via a first BT Short-Range (SR) link, a BT Long-Range (LR) link and a second BT SR link, wherein the first BT SR link to be between the first BT audio device and the first BT mobile device, the BT LR link to be between the first BT mobile device and a second BT mobile device, and the second BT SR link to be between the second BT mobile device and the second BT audio device; means for communicating a BT SR packet with the first BT audio device over the first BT SR link, the BT SR packet comprising a voice payload to be communicated between the first BT audio device and the second BT audio device; and means for communicating a BT LR packet with the second BT mobile device over the BT LR link, the BT LR packet comprising the voice payload.

Example 76 includes the subject matter of Example 75, and optionally, comprising means for allocating a plurality of first SR time slots of an SR link connection period as an LR communication period for communication over the BT LR link, communicating the BT LR packet during the LR communication period, and communicating the BT SR packet over one or more second SR time slots of the SR link connection period.

Example 77 includes the subject matter of Example 76, and optionally, wherein the SR link connection period comprises twelve SR time slots, the LR communication period comprises ten SR time slots, and the one or more second SR time slots comprise two SR time slots.

Example 78 includes the subject matter of Example 76, and optionally, wherein the SR link connection period comprises twelve SR time slots, the LR communication period comprises eight SR time slots, and the one or more second SR time slots comprise four SR time slots.

Example 79 includes the subject matter of any one of Examples 76-78, and optionally, comprising means for communicating full-duplex voice traffic over the BT LR link, allocating one or more first SR time slots from the plurality of first SR time slots to an LR transmit time slot, allocating one or more second SR time slots from the plurality of first SR time slots to a first LR receive time slot, allocating one or more third SR time slots from the plurality of first SR time slots to an LR re-transmit time slot, and allocating one or more fourth SR time slots from the plurality of first SR time slots to a second LR receive time slot.

Example 80 includes the subject matter of any one of Examples 76-79, and optionally, comprising means for communicating half-duplex voice traffic over the BT LR link, allocating one or more first SR time slots from the plurality of first SR time slots to an LR transmit time slot, allocating one or more second SR time slots from the plurality of first SR time slots to an Acknowledge (Ack) time slot, and allocating one or more third SR time slots from the plurality of first SR time slots to an LR re-transmit timeslot.

Example 81 includes the subject matter of Example 80, and optionally, wherein the LR transmit time slot comprises a 500 kilobit per second (kbps) LR transmit time slot, the Ack time slot comprises a 125 kbps Ack time slot, and the LR re-transmit time slot comprises a 125 kbps re-transmit time slot.

Example 82 includes the subject matter of Example 80, and optionally, wherein the LR transmit time slot comprises a 125 kilobit per second (kbps) LR transmit time slot, the Ack time slot comprises a 125 kbps Ack time slot, and the LR re-transmit time slot comprises a 125 kbps re-transmit time slot.

Example 83 includes the subject matter of any one of Examples 75-82, and optionally, wherein the BT LR packet comprises a Cyclic Redundancy Check (CRC) field having a length of 16 bits.

Example 84 includes the subject matter of any one of Examples 75-83, and optionally, comprising means for excluding a length field from a header of the BT LR packet.

Example 85 includes the subject matter of any one of Examples 75-84, and optionally, comprising means for excluding a Message Integrity Check (MIC) field from the BT LR packet.

Example 86 includes the subject matter of any one of Examples 75-85, and optionally, comprising means for communicating full-duplex voice traffic over the BT LR link at a rate of 500 kilobit per second (kbps).

Example 87 includes the subject matter of any one of Examples 75-86, and optionally, comprising means for communicating half-duplex voice traffic over the BT LR link at a rate of 125 kilobit per second (kbps).

Example 88 includes the subject matter of any one of Examples 75-86, and optionally, comprising means for communicating half-duplex voice traffic over the BT LR link by communicating the BT LR packet at a transmission rate of 500 kilobit per second (kbps), and communicating a retransmission of the BT LR packet over the BT LR link at a retransmission rate of 125 kbps.

Example 89 includes the subject matter of any one of Examples 75-88, and optionally, comprising means for receiving the BT SR packet from the first BT audio device over the BT SR link, the voice payload is from the first BT audio device, and transmitting the BT LR packet to the second BT mobile device over the BT LR link.

Example 90 includes the subject matter of any one of Examples 75-88, and optionally, comprising means for receiving the LR BT packet from the second BT mobile device over the BT LR link, the voice payload is from the second BT audio device, and transmitting the BT SR packet to the first BT audio device over the BT SR link.

Example 91 includes the subject matter of any one of Examples 75-90, and optionally, wherein the first BT audio device comprises a headset to be paired with the first BT mobile device.

Example 92 includes the subject matter of any one of Examples 75-91, and optionally, wherein the first BT SR link comprises an enhanced Synchronous Connection-Oriented (eSCO) link according to a Hands Free Profile (HFP).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a first Bluetooth (BT) mobile device to:
configure a Point-to-Point (P2P) voice link for voice communication between a first BT audio device and a second BT audio device via a first BT Short-Range (SR) link, a BT Long-Range (LR) link and a second BT SR link, wherein the first BT SR link to be between the first BT audio device and the first BT mobile device, the BT LR link to be between the first BT mobile device and a second BT mobile device, and the second BT SR link to be between the second BT mobile device and the second BT audio device, wherein configuring the P2P voice link comprises allocating a plurality of first SR time slots of an SR link connection period as an LR communication period for communication over the BT LR link;

communicate a BT SR packet with the first BT audio device over the first BT SR link in one or more second SR time slots of the SR link connection period, the BT SR packet comprising a voice payload from one of the first and second BT audio devices to another one of the first and second BT audio devices; and communicate a BT LR packet with the second BT mobile device over the BT LR link during the LR communication period, the BT LR packet comprising the voice payload.

2. The apparatus of claim 1, wherein the SR link connection period comprises twelve SR time slots, the LR communication period comprises a first count of SR time slots from the twelve SR time slots, and the one or more second SR time slots comprise a second count of SR time slots from the twelve SR time slots.

3. The apparatus of claim 1, wherein the SR link connection period comprises twelve SR time slots, the LR communication period comprises ten SR time slots, and the one or more second SR time slots comprise two SR time slots.

4. The apparatus of claim 1, wherein the SR link connection period comprises twelve SR time slots, the LR communication period comprises eight SR time slots, and the one or more second SR time slots comprise four SR time slots.

5. The apparatus of claim 1 configured to cause the first BT mobile device to communicate full-duplex voice traffic over the BT LR link, to allocate one or more first SR time slots from the plurality of first SR time slots to an LR transmit time slot, to allocate one or more second SR time slots from the plurality of first SR time slots to a first LR receive time slot, to allocate one or more third SR time slots from the plurality of first SR time slots to an LR re-transmit time slot, and to allocate one or more fourth SR time slots from the plurality of first SR time slots to a second LR receive time slot.

6. The apparatus of claim 1 configured to cause the first BT mobile device to communicate half-duplex voice traffic over the BT LR link, to allocate one or more first SR time slots from the plurality of first SR time slots to an LR transmit time slot, to allocate one or more second SR time slots from the plurality of first SR time slots to an Acknowledge (Ack) time slot, and to allocate one or more third SR time slots from the plurality of first SR time slots to an LR re-transmit timeslot.

7. The apparatus of claim 6, wherein the LR transmit time slot comprises a 500 kilobit per second (kbps) LR transmit time slot, the Ack time slot comprises a 125 kbps Ack time slot, and the LR re-transmit time slot comprises a 125 kbps re-transmit time slot.

8. The apparatus of claim 6, wherein the LR transmit time slot comprises a 125 kilobit per second (kbps) LR transmit time slot, the Ack time slot comprises a 125 kbps Ack time slot, and the LR re-transmit time slot comprises a 125 kbps re-transmit time slot.

9. The apparatus of claim 1, wherein the BT LR packet comprises a Cyclic Redundancy Check (CRC) field having a length of 16 bits.

10. The apparatus of claim 1 configured to cause the first BT mobile device to exclude a length field from a header of the BT LR packet.

11. The apparatus of claim 1 configured to cause the first BT mobile device to exclude a Message Integrity Check (MIC) field from the BT LR packet.

12. The apparatus of claim 1 configured to cause the first BT mobile device to communicate full-duplex voice traffic over the BT LR link at a rate of 500 kilobit per second (kbps).

13. The apparatus of claim 1 configured to cause the first BT mobile device to communicate half-duplex voice traffic over the BT LR link at a rate of 125 kilobit per second (kbps).

14. The apparatus of claim 1 configured to cause the first BT mobile device to communicate half-duplex voice traffic over the BT LR link by communicating the BT LR packet at a transmission rate of 500 kilobit per second (kbps), and communicating a retransmission of the BT LR packet over the BT LR link at a retransmission rate of 125 kbps.

15. The apparatus of claim 1 configured to cause the first BT mobile device to receive the BT SR packet from the first BT audio device over the BT SR link, the voice payload is from the first BT audio device, and to transmit the BT LR packet to the second BT mobile device over the BT LR link.

16. The apparatus of claim 1 configured to cause the first BT mobile device to receive the LR BT packet from the second BT mobile device over the BT LR link, the voice payload is from the second BT audio device, and to transmit the BT SR packet to the first BT audio device over the BT SR link.

17. The apparatus of claim 1, wherein the first BT audio device comprises a headset to be paired with the first BT mobile device.

18. The apparatus of claim 1, wherein the first BT SR link comprises an enhanced Synchronous Connection-Oriented (eSCO) link according to a Hands Free Profile (HFP).

19. The apparatus claim 1 comprising a BT radio, one or more antennas connected to the BT radio, a memory, and a processor.

20. A product comprising one or more tangible computer-readable non-transitory storage media comprising computer-executable instructions operable to, when executed by at least one processor, enable the at least one processor to cause a first Bluetooth (BT) mobile device to:

configure a Point-to-Point (P2P) voice link for voice communication between a first BT audio device and a second BT audio device via a first BT Short-Range (SR) link, a BT Long-Range (LR) link and a second BT SR link, wherein the first BT SR link to be between the first BT audio device and the first BT mobile device, the BT LR link to be between the first BT mobile device and a second BT mobile device, and the second BT SR link to be between the second BT mobile device and the second BT audio device, wherein configuring the P2P voice link comprises allocating a plurality of first SR time slots of an SR link connection period as an LR communication period for communication over the BT LR link;

communicate a BT SR packet with the first BT audio device over the first BT SR link in one or more second SR time slots of the SR link connection period, the BT SR packet comprising a voice payload from one of the first and second BT audio devices to another one of the first and second BT audio devices; and communicate a BT LR packet with the second BT mobile device over the BT LR link during the LR communication period, the BT LR packet comprising the voice payload.

21. The product of claim 20, wherein the SR link connection period comprises twelve SR time slots, the LR communication period comprises a first count of SR time slots from the twelve SR time slots, and the one or more second SR time slots comprise a second count of SR time slots from the twelve SR time slots.

22. The product of claim 20, wherein the instructions, when executed, cause the first BT mobile device to communicate full-duplex voice traffic over the BT LR link at a rate of 500 kilobit per second (kbps).

23. The product of claim 20, wherein the instructions, when executed, cause the first BT mobile device to communicate half-duplex voice traffic over the BT LR link at a rate of 125 kilobit per second (kbps).

24. An apparatus of a first Bluetooth (BT) mobile device, the apparatus comprising:
   means for configuring a Point-to-Point (P2P) voice link for voice communication between a first BT audio device and a second BT audio device via a first BT Short-Range (SR) link, a BT Long-Range (LR) link and a second BT SR link, wherein the first BT SR link to be between the first BT audio device and the first BT mobile device, the BT LR link to be between the first BT mobile device and a second BT mobile device, and the second BT SR link to be between the second BT mobile device and the second BT audio device, wherein configuring the P2P voice link comprises allocating a plurality of first SR time slots of an SR link connection period as an LR communication period for communication over the BT LR link;
   means for communicating a BT SR packet with the first BT audio device over the first BT SR link in one or more second SR time slots of the SR link connection period, the BT SR packet comprising a voice payload from one of the first and second BT audio devices to another one of the first and second BT audio devices; and
   means for communicating a BT LR packet with the second BT mobile device over the BT LR link during the LR communication period, the BT LR packet comprising the voice payload.

25. The apparatus of claim 24 comprising means for communicating full-duplex voice traffic over the BT LR link at a rate of 500 kilobit per second (kbps), and communicating half-duplex voice traffic over the BT LR link at a rate of 125 kilobit kbps.

* * * * *